(12) United States Patent  
Torgersrud et al.

(10) Patent No.: US 9,030,292 B2
(45) Date of Patent: May 12, 2015

(54) INTERACTIVE AUDIO/VIDEO SYSTEM AND DEVICE FOR USE IN A SECURE FACILITY

(75) Inventors: Richard Torgersrud, San Francisco, CA (US); Kevin O'Neil, Parma, ID (US); Grant Gongaware, San Francisco, CA (US); Morgan Collins, San Mateo, CA (US)

(73) Assignee: Telmate, LLC

( * ) Notice: Subject to any disclaimer, the term of this patent is extended or adjusted under 35 U.S.C. 154(b) by 172 days.

(21) Appl. No.: 13/088,883

(22) Filed: Apr. 18, 2011

(65) Prior Publication Data
US 2012/0262271 A1 Oct. 18, 2012

(51) Int. Cl.
*G06F 21/32* (2013.01)
(52) U.S. Cl.
CPC ...................................... *G06F 21/32* (2013.01)
(58) Field of Classification Search
USPC ............... 340/5.51–5.54, 5.8, 5.81–5.85, 5.2, 340/5.21, 5.28, 5.31; 725/9, 10, 12, 14, 30, 725/98, 99; 382/118, 115; 348/14.01–14.16; 345/173; 713/168, 713/186
See application file for complete search history.

(56) References Cited

U.S. PATENT DOCUMENTS

| | | | |
|---|---|---|---|
| 6,665,380 B1 * | 12/2003 | Cree et al. ................... | 379/88.25 |
| 7,529,357 B1 | 5/2009 | Rae et al. | |
| 8,340,260 B1 * | 12/2012 | Rae et al. ....................... | 379/189 |
| 2002/0101512 A1 * | 8/2002 | Klapman et al. ............... | 348/207 |
| 2004/0003079 A1 * | 1/2004 | Aiu et al. ........................ | 709/225 |
| 2006/0259755 A1 * | 11/2006 | Kenoyer ........................... | 713/1 |
| 2006/0285667 A1 * | 12/2006 | Hodge ..................... | 379/142.05 |
| 2008/0129816 A1 * | 6/2008 | Mattila et al. .............. | 348/14.08 |
| 2010/0259500 A1 * | 10/2010 | Kennedy ........................ | 345/173 |
| 2010/0313276 A1 * | 12/2010 | Banti et al. ....................... | 726/28 |
| 2011/0047473 A1 * | 2/2011 | Hanna et al. .................. | 715/740 |
| 2011/0088086 A1 * | 4/2011 | Swink et al. ...................... | 726/7 |

* cited by examiner

*Primary Examiner* — Brian Zimmerman
*Assistant Examiner* — Laura Nguyen
(74) *Attorney, Agent, or Firm* — Venable LLP

(57) ABSTRACT

A system and device for providing services to a secure facility. The system includes a kiosk with a processor, display, speaker, microphone, and a camera, and the kiosk communicates with a server that includes a server processor, a network interface unit, and a computer memory. The kiosk receives communications and transmits audio and video of the communications to the server via an internet connection, and the server records the audio and video and transmits the audio and video to a destination. The kiosk is configured to authenticate the identity of a user by verifying a personal identification number entered by the user and also performing one or more of a facial recognition via the camera or a biometric voice recognition via the microphone. The kiosk provides access to services including internet services, text-based messaging, tele-medical services, religious and educational materials, commissary ordering, and entertainment.

29 Claims, 18 Drawing Sheets

1201

| | | | | | | | |
|---|---|---|---|---|---|---|---|
| Tellmate | Ken Jones | Prepaid Balance: $5.00 | | T-Phone Reserved at 5:00pm | | Friday, July 31 3:15pm | |

Voicemail `<<`

^ UP ^

1202  1203

| > | 2 Plays Left | 4/12/10 @ 3:12pm | (505) 121-1234 | Inmate S | $ | Call Back | X |
| \|\| | 1 Play Left | 4/12/10 @ 3:00pm | (626) 555-1212 | Inmate J. | $ | Call Back | X |
| | No Plays Left | 4/10/10 @ 2:00pm | (714) 123-2341 | Indiana Jones | $ | Call Back | X |
| | No Plays Left | 4/8/10 @ 11:12am | (818) 135-5613 | Jenny Jones | $ | Call Back | X |
| | No Plays Left | 4/6/10 @ 7:02am | (213) 135-1356 | | | Call Back | X |
| | No Plays Left | 3/12/10 @ 8:02am | (650) 133-1351 | Ginger | $ | Call Back | X |
| | No Plays Left | 3/12/10 @ 7:21pm | (800) 135-1351 | Don Draper | | Call Back | X |
| | No Plays Left | 2/6/10 @ 6:00pm | (866) 121-1315 | Mom | | Call Back | X |

1204 (bracket on left)

v DOWN v

Logout   Buy Tphone Time   Main Menu                     Volume   Help   Español

INTERACTIVE AUDIO/VIDEO SYSTEM AND DEVICE FOR USE IN A SECURE FACILITY

FIELD OF THE INVENTION

Embodiments described herein relate generally to interactive computer systems, and more specifically to providing a multipurpose interactive audio/video platform and device for use in a secure facility.

BACKGROUND OF THE INVENTION

Secure facilities such as prisons, institutions, and other government facilities house large populations of individuals in confinement. Such facilities present unique administrative challenges—including challenges related to providing educational, entertainment, communications, and other services. Most notably, secure facilities require additional levels of monitoring and oversight that are not required when similar services provided to other populations. Additionally, since a large number of individuals may be confined in a relatively small space, certain efficiencies must be achieved to effectively administer the various services of the facility.

Currently, the services are provided piecemeal—with each service handled by different technological means and often even different departments or service providers. For example, one service provider may provide telecommunications service, while another handles educational or entertainment programs. These services are provided separately from purely administrative services such as scheduling visitations, processing complaints, providing commissary services, or other facility requirements that may be provided by in-house departments of the secure facility. Significant efficiencies can be achieved by automating these various services and by providing them in a centralized manner. Moreover, providing these services by a centralized computer system can facilitate more effective monitoring of resident activity. With more effective monitoring in place, it is possible to provide additional services that can provide supplemental revenue to the facilities. Accordingly, there is a need for a way to administer various services required in a secure facility that is efficient, secure, and effective.

BRIEF DESCRIPTION OF THE DRAWINGS

FIG. 12 illustrates an example voicemail screen of the kiosk interface.

FIG. 16 illustrates an example kite screen of the kiosk interface.

DETAILED DESCRIPTION OF THE INVENTION

Embodiments described herein address the problems with current provision of administrative services for secure facilities such as prisons or other government detention centers. The described embodiments provide a customized interactive audio/video platform for providing administrative services. The customized interactive audio/video platform includes, among other things, kiosks at secure facilities that are interconnected via a central processing platform providing enhanced security and monitoring services. The kiosks provide, among other things, telephony services, video conferencing, text messaging, tele-medical services, religious and educational services, commissary services, entertainment services, and social networking. The services are provided in a manner that meets the strict guidelines of a secured facility such as, e.g., a prison.

Embodiments may be implemented using computer hardware or software, or a combination of both. Computer software implementing features of the embodiments may be stored as instructions on a tangible computer readable medium. References to the "system" or "platform" describe specific embodiments and do not limit the scope of the claimed invention.

Though embodiments are described with reference to facilities such as prisons or detention facilities, the embodiments described herein could be used in any facility requiring consolidated secure services.

It should be understood that embodiments of the invention are not limited by the example embodiments described herein and that changes can be made thereto. Example embodiments are now described with reference to the accompanying figures wherein like reference numbers are used consistently for like features throughout the drawings.

Figure 1:
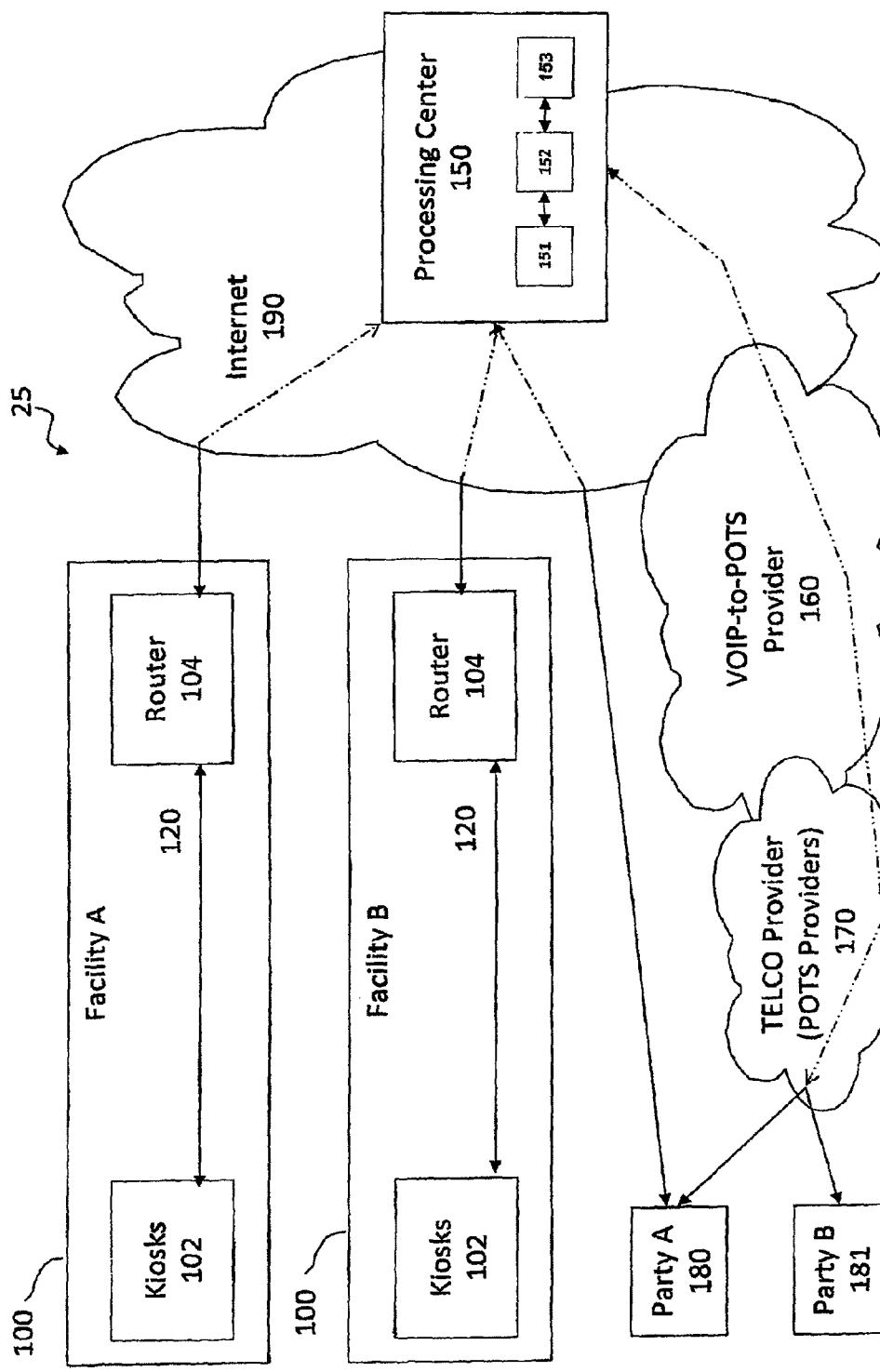
FIG. 1 illustrates an embodiment of the interactive audio/video platform.

FIG. 1 illustrates an embodiment of an example interactive audio/video platform 25 that includes kiosks 102 for providing administrative services at multiple facilities 100. The platform 25 includes a processing center 150 connected to one or more facilities 100 through a network such as, e.g., the Internet 190. Facilities 100 may be any facilities requiring voice, video and/or information services, especially those with security requirements and a large traffic volumes, including secure facilities such as prisons or other government detention facilities. Each facility 100 contains at least one kiosk 102. Each kiosk 102 is connected to a router 104 via a networking link 120. The routers 104 are configured to communicate with the processing center 150, which may be distributed across several locations. The routers 104 each connect the communications received from the kiosks 102 to the Internet 190, and exchange IP (Internet Protocol) packets bidirectionally between the processing center 150 and facility 100. The processing center 150 includes application hardware and software for data processing and the other functions described below.

The processing center 150 is a system that is distributed across multiple clusters 151-153, which may or may not be geographically diverse (described below in more detail). Each cluster 151-153 hosts multiple nodes, including an application node, a database node, and a traffic processing node (discussed below in relation to FIG. 2). The clusters 151-153 communicate with each other via the Internet or dedicated connections, and information in any database node can be shared among the clusters 151-153. Data storage and retrieval can be performed across several clusters. The clusters 151-153 can also provide fail-over for one another, and routers 104 at each facility may be configured to communicate with another cluster if a primary cluster is unavailable. Similarly, resources of the nodes within a cluster (which may include multiple computers) can be reallocated as processing needs require.

One function of the processing center 150 is to route communications from facility residents using kiosks 102 to outside parties 180, 181. The processing center 150 routes voice, text, and/or video traffic from facility kiosks 102 to their ultimate destinations 180, 181. To route voice communications traffic, the processing center 150 communicates via internet protocol to a "VoIP-to-POTS" provider 160, which converts VoIP communications to POTS communications. Example VoIP-to-POTS providers 160 include Paetech, Level 3, and Verizon. After converting the VoIP signal to a POTS signal, the VoIP-to-POTS provider 160 provides the communication to a telecommunications provider 170 that routes the call to the called parties 180, 181.

The processing center 150 may be in communication with multiple VoIP-to-POTS providers 160, and may route communications to any one of the providers 160 based on various factors including time-of-day, load, or rates. Similarly, the processing center 150 or the VoIP-to-POTS provider 160 may route calls to various telecommunications providers 170 based on factors including time-of-day, load, or rates. For example, VoIP-to-POTS providers 160 often have connection limits. Therefore, the processing center 150 may be configured to first attempt a connection to a primary VoIP-to-POTS provider 160 with a low rate for a given call destination. If that connection is refused, then the processing center 150 would be configured to attempt connections to a second, and perhaps third VoIP-to-POTS provider 160 until a connection is established.

The processing center 150 can also receive calls from outside parties 180, 181 and route the calls to facility kiosks 102. The VoIP-to-POTS provider 160 may convert the POTS signal to a VoIP signal before the communication is sent to the processing center 150. Alternatively, although not shown in FIG. 1, the outside callers 180, 181 may place a call using the traditional telecommunications provider 170 and may be directly connected to the processing center 150 where the signal is converted using an A/D converter. The processing center can connect outside callers 180, 181 to residents and can also allow outside callers 180, 181 to leave voicemail messages.

The processing center 150 also routes video and text communications. Communications received from facility routers 104 are stored or cached on web servers in the processing center 150 or on third party web servers. In addition to storing communications routed through the processing center 150, the processing center 150 may be configured to receive and store recordings of local communications that have been recorded at the facilities 100 (e.g., local video communications). The communications stored at the processing center 150 can be accessed by an outside party 180, 181 by using a web browser on a computer connected to the Internet 190. The processing center is also configured to receive requests for data from the routers 104, such as hypertext transfer protocol (HTTP) requests, and return information to the routers 104, such as information on a third party website.

Another function of the processing center 150 is to log information into databases. The processing center 150 logs all voice and data traffic, and may record voice or video traffic according to predefined rules. The processing center 150 also logs all failed and/or blocked communication attempts, such as attempts to call third parties that a facility resident is prohibited from contacting. Local activity logs on the kiosks 102 may be periodically uploaded to the processing center 150.

Figure 2:
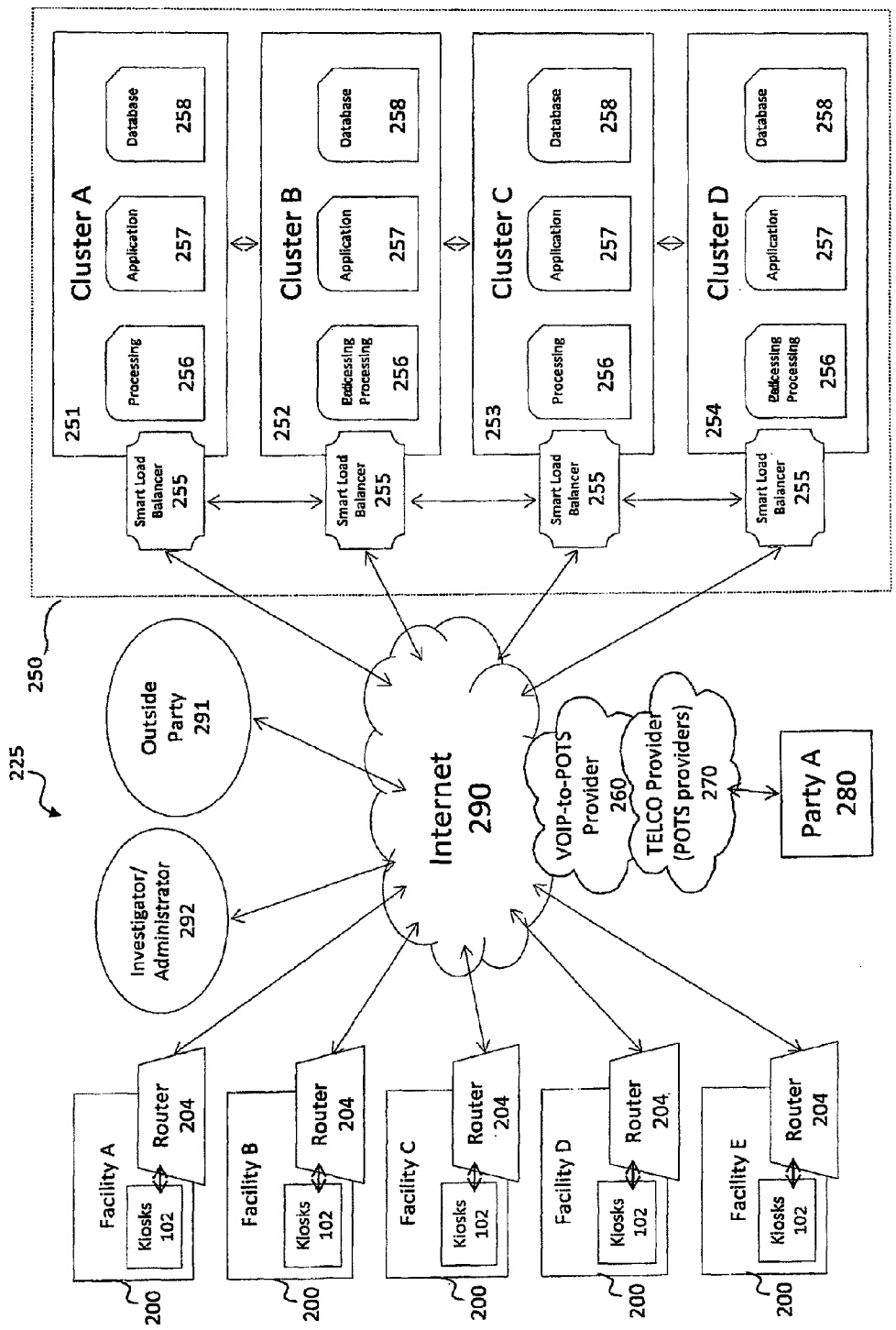
FIG. 2 illustrates the organization and interaction of clusters of another embodiment of the interactive audio/video platform.

FIG. 2 is a system diagram showing the organization and interaction of clusters of another example interactive audio/video platform 225. FIG. 2 illustrates multiple facilities 200, each connected to the Internet 290 via a router 204. The facilities 200, which may include at least one kiosk, communicate, via the Internet 290, with a processing center 250 that is made up of multiple call clusters 251-254.

FIG. 2 illustrates a first central processing cluster 251 in location A, a second central processing cluster 252 in location B, a third central processing cluster 253 in location C, and a fourth central processing cluster 254 in location D. The central processing clusters 251-254 together operate as the processing center 250, and each cluster may include one or many computers functioning together to perform various tasks. The central processing clusters 251-254 may be located in different geographic regions, and one or more of the central processing clusters 251-254 may function as backup clusters or overflow clusters, operating only when other clusters are unavailable or overloaded.

The routers 204 at each facility 200 may be configured to route communications for a particular facility to a predetermined central processing cluster, and may be set to route communications to another central processing cluster if the predetermined central processing cluster is unavailable. Alternatively, the routers 204 may be configured to distribute communications across multiple processing clusters according to a predetermined ratio (described below). These two configurations may be used alternatively or in conjunction with one another, and their use could be determined based on the traffic load on a network.

The routers 204 may also be configured to route communications over multiple outbound network connections at each facility 200. The router 204 may be configured to use a second network connection when a first network connection is unavailable. For example, a facility may be serviced (i.e., communication with the outside world) by a DSL line and a T1 line, and the DSL line may be used as a backup when the T1 line becomes unavailable. As mentioned above, a router 204 may also be configured to distribute communications across multiple network connections according to a predetermined ratio. For example, if a facility is serviced by multiple T1 lines, the router 204 may be configured to distribute the call-data load across the T1 lines to a single cluster, or multiple clusters, allowing a large capacity of calls to be carried simultaneously. These configurations may be used alternatively or in conjunction with one another, and their use could be determined based on the traffic load on the network.

Each central processing cluster 251-254 includes multiple nodes each performing various functions. A central processing cluster may be one computer that is divided into virtual servers, each of which is treated as a node in the cluster. Alternatively, each node may be a dedicated computer, or multiple computers can form each node. Servers can be added as necessary to increase capacity of the cluster.

An example cluster for use in a secure facility is now described. Secure facilities, such as prisons, have unique features that must be addressed by the interactive audio/video platform 225. For example, residents have limited access to cash, and so the platform provides various ways of paying for telephone and/or data access. An account is established for each resident, and funding of the account is provided via kiosks, calling cards, and an interactive voice response system. Provisioning for outside funding may also be desirable. Accordingly, the platform 225 may provide for funding of an account by an outside party via live customer service, an interactive voice response system, a website, or kiosks in visiting areas of the facilities.

The interactive audio/video platform 225 may also allow collect calls to be placed by residents. A common problem with collect call systems is that, because a called party may not recognize the number or know what individual from the facility is calling, there must be a way for a resident to identify themselves. In traditional collect call systems, an individual may be allowed to record their name to be played to a called party. This, however, can permit the transmission of a short message without payment for use of the system. Accordingly, the platform 225 may instead retrieve and play an audio clip of the inmate's name that was recorded under supervision, or that was recorded by another party, or generated by a voice synthesizer.

System accounts must be tied to particular facility residents and must be only accessible by those facility residents. To accomplish this, the platform 225 may require a resident, upon accessing the system, to enter a unique PIN number that is associated with the resident. Additional PIN numbers may be required to access voicemail or other secure features. The platform 225 may also include voice and/or facial recognition features, described in more detail below.

Secure facilities also often place restrictions on the communications of residents. Accordingly, the platform 225 is able to automatically restrict a resident from making calls or video and text communications with certain destinations based on restrictions noted in the residents' accounts. Similarly, the platform 225 prevents outside callers from leaving voicemail messages for inmates that are restricted from communicating with the outside caller. The platform 225 may also place time limits on calls, and may include audio and/or video warnings that a call may be cut off due to time restrictions. Additionally, the platform 225 may prevent a resident from accessing certain kiosk features, such as entertainment features, based on a variety of time, facility, or other rules.

Secure facilities also require activity logging and monitoring capabilities. The logging may include storing information such as when a communication was made, to whom, and how long it lasted. Full audio and/or video recording of communications may also be necessary in prisons, for example, where virtually all communications need to be recorded and retrieved by investigators. Investigators may also need to monitor live communications. These functions can be automated by the platform 225. The platform 225 may also be set to not record certain communications, such as communications between an inmate and his attorney or a doctor. This can be automated by including attorney or doctor numbers on a "do-not-record" list for the system or resident's account or by providing an option to request that a communication not be recorded via an interactive response system. The request may be reviewed by a live operator for authenticity, or may be logged for further review to detect abuse.

Each central processing cluster 251-254 includes a data processing node 256. The data processing node 256 hosts data routing, communication recording, and logging functionality. The data processing node 256 is also responsible for digital signal processing. Audio routing and recording may be used to process and route calls to destination parties, or to record and retrieve voicemail messages or communications records. The data processing node 210 may be one or many computers functioning together to form the node.

The data processing node 256 is responsible for routing communications to telecommunications providers 270 and routing video and data traffic to and from other kiosks 102 or third party servers 203. For telephone calls, a distributed carrier system allows clusters to access multiple VoIP-to-POTS providers 260 and telecommunications providers 270 to terminate any call. If one carrier is overloaded, the data processing node 256 will seek the next available carrier based on a set of predefined rules that govern priority. Priority can be set based on factors such as rate, time of day, call termination point, and carrier load. The data processing node 256 may optionally track the number of connections sent to a single carrier, and automatically route calls to a different carrier based on the carrier load. Call processing administrators can adjust the priority at any time via a single, dedicated interface.

Each central processing cluster 251-254 includes an application node 257. The application node 257 hosts payment validation, security, user interface, and business logic functionality. Business logic functionality includes all the rules governing communications or information access. This could include, for example, fraud prevention and protection, schedule limits defined per resident, facility, phone, or destination number, or alarms for triggering investigation. The application node 257 is also responsible for implementing rules related to call acceptance, communications blocking, recording, and logging functionality. The application node 257 can be accessed by authorized users via an administrative web page. By accessing the application node, administrators and investigators 240 can retrieve recorded calls, and can review records and adjust settings, such as calling or voicemail permissions for facility residents. Customer service personnel 241 can also use a web page to review issues reported by facility residents or outside callers. The application node 257 may be one or many computers functioning together to form the node.

Each central processing cluster 251-254 also includes a database node 258. The database node hosts settings for the business logic functionality. The database node 258 also stores indexed logs, audio and video communication recordings, voicemail recordings, and settings for individual residents and facilities. The database node 258 may be one or many computers functioning together to form the node. The database nodes 258 at each central processing cluster 251-254 may replicate some or all of the data at another database node. Since some facilities may impose rules regarding the geographic location where their data is stored, the central processing cluster 251-254 may include rules that define the data that the databases will replicate for each facility.

Central processing clusters 251-254 are connected to a communications network and to one another via smart load balancers 255. The smart load balancers 255 may be configured to communicate with one another over the Internet or through a dedicated communications network or link. The smart load balancers 255 may be configured to communicate to periodically update status information stored at each smart load balancer. The smart load balancers 255 can accordingly redirect incoming communications received from routers 204 based on the availability or load on a particular central processing cluster, and can redirect outgoing communications based on the responsiveness of a provider network.

Central processing clusters 251-254 can also share and retrieve data from one another directly via a communications link or over the Internet. For example, if a resident at Facility A makes a request for a voicemail or text message, and the request has been routed to central processing cluster 251, but the desired data is stored on central processing cluster 252, cluster 251 can retrieve the audio from cluster 252 for playback. Similarly, an investigator reviewing recordings via the web site interface can be communicating with the application node 257 using any central processing cluster 251-254 and can retrieve recordings from any cluster. Logs and recordings can be stored at multiple geographically diverse locations and may be backed up at separate locations for redundancy. A central processing cluster 251-254 can identify a storage location of data by referencing a cluster identifier that is included with each piece of call data in a database node 258. Accordingly, the databases storing data do not need to be replicated across clusters (though they can be).

The multiple central processing clusters 251-254 provide full cluster fail-over. That is, if one of the central processing clusters 251-254 fails, the routers 204 at the facilities are configured to automatically seek and connect to another cluster. Similarly, the smart load balancers 255 are configured to redirect incoming and/or outgoing communications when a particular cluster 251-254 is unavailable or non-responsive. In both instances, the other cluster can take over call processing duties and allow communications to continue. Using multiple computers at each node of a cluster ensures that, if a single node in the cluster fails, another node can take over all of the functions of the failed node. Resources of a node in a cluster may be reallocated based on processing requirements. This all happens seamlessly without affecting configurations at the facilities 200 or the routers 204.

Investigators and administrators 292 can access the platform 225 using a computer with a web browser. The web interface of the platform 225 enables investigators and administrators 292 to view logs, listen to and view audio and video recordings, and change configuration settings for their facility. Outside parties 291 can also use a web browser to access a web interface that enables them to create an account, add funds to their account or to a resident account, or send and receive audio, text, and/or video messages to and from a resident, as described in more detail below.

By removing the processing centers 150, 250 from the facility 100, 200 and distributing it across multiple clusters, sensitive computer hardware can be housed in special environmentally controlled and secure hosting environments that may be geographically dispersed. Clusters of computer hardware can operate independent of one another, allowing for redundancy and failovers. If a cluster completely fails, another functional cluster can take over all computing processes. Additionally, an individual cluster is redundant within itself, so that should any node of the cluster fail, resources can be reallocated to perform the required functions of the node.

Computing clusters can handle large volumes of voice and data traffic from multiple locations more effectively than non-cluster solutions. This is a result of clusters being able to adapt to call load and expand capacity as needed. The resources within a cluster 251-254 can also be adjusted dynamically as service needs require. For example, if a call processing node 256 becomes overloaded, resources can be redirected from another node. This applies across clusters 251-254 as well; if a cluster starts to come under heavy load or become nonresponsive, connected clients can be shifted to a different cluster.

Multiple clusters also facilitate maintenance and expansion, as they allow operations at a single location to be interrupted for planned or unplanned servicing without bringing down communications and services. Clusters allow near limitless scalability as service needs expand. This can be accomplished by increasing computing capacity of the cluster, with no downtime. This also leads to hardware cost savings as service capacity can be increased with minimal hardware investment. Services within a cluster can be upgraded, or computing capacity added without affecting service availability. Higher uptime results in enhanced revenue. Fast replacement and maintenance is facilitated by having service personnel and replacement equipment in close proximity to a small number of cluster locations.

Figure 3:
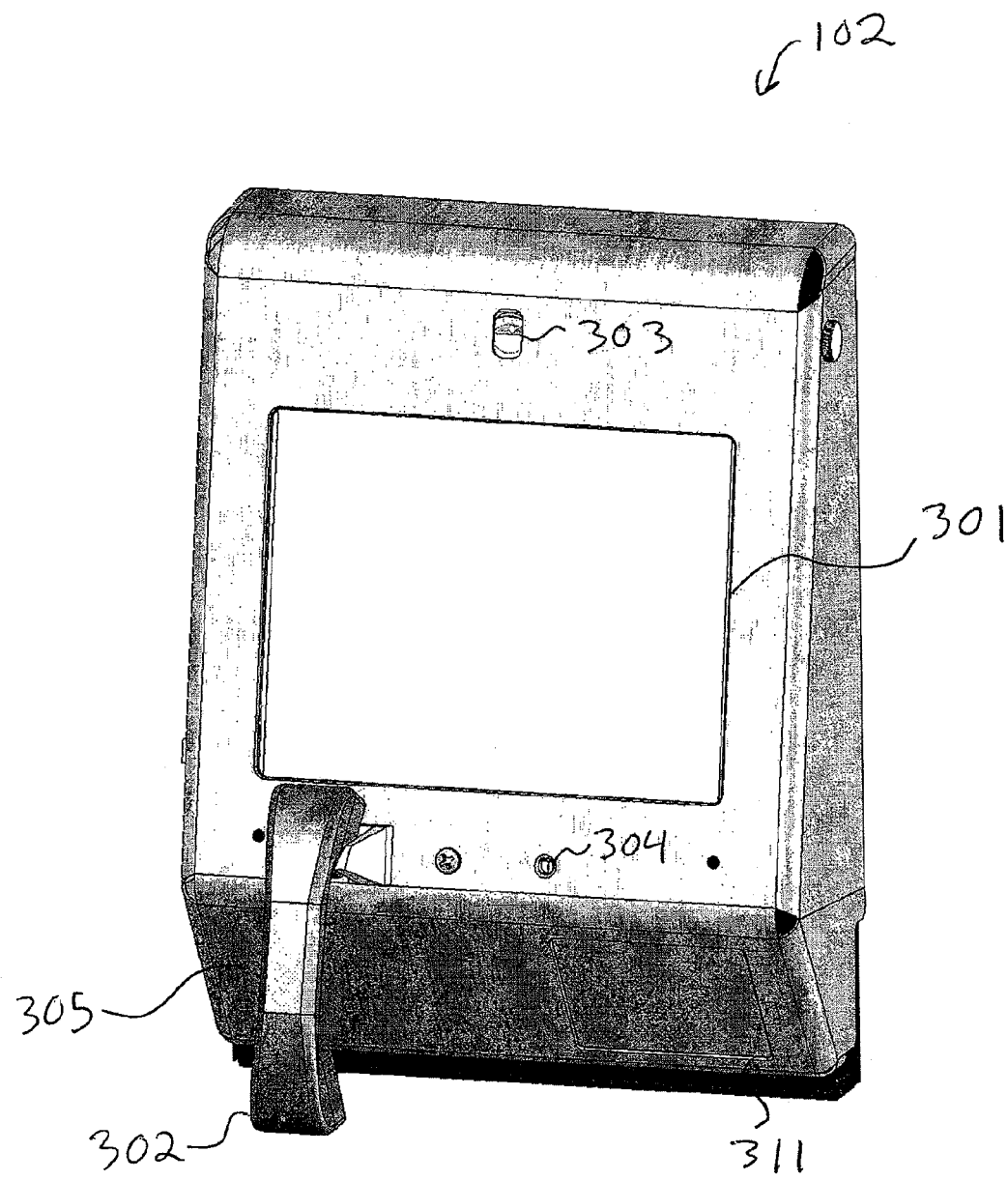
FIG. 3 illustrates an example kiosk for use in the interactive audio/video platform.

FIG. 3 illustrates an example kiosk 102 used in an embodiment of the interactive audio/video platform. The kiosk 102 includes an integrated camera 303 that can be used for video communications or for user authentication via facial recognition. The kiosk 102 also includes a touch screen 301 that displays images and can detect the presence and location of a user's touch within the display area. The touch screen 301, may be, for example, a 15 inch capacitive or resistive touch screen display. The touch screen 301 serves as the main kiosk interface with a user. A telephone handset 302 connected to the kiosk 102 includes a speaker and a microphone. The telephone handset 302 can be used to issue voice commands and provide voice authentication as required, or it can be used for voice and video communications, among other things. The telephone handset 302 is optional, as a kiosk user may instead plug in a headphones or headphones with an in-line microphone using one or more stereo headphone jacks 304. Stereo headphone jacks 304 can also be located on the side of the kiosk 102 or behind a movable panel 311, which can be locked in a position exposing the jacks 304, or in a position blocking them, depending on the preferences of the facility. A USB interface optionally located behind the movable panel 311 can be used for system diagnostics by technicians or to synchronize files to an external device, such as a portable media player. The kiosk 102 also includes a speaker 305 that provides audio output.

While FIG. 3 illustrates a kiosk that is a wall-mountable kiosk, other structural forms, enclosures, or designs are possible. The kiosk 102 may be any shape or size suitable to providing the described components and services. The kiosk 102 may be, for example, a standalone structure, a personal computer, a laptop, a mobile device, or a tablet computer device. If the kiosk 102 is in the form of a laptop, mobile device, or tablet computer, it may be a ruggedized device designed to withstand physical shock, and may be integrated with a docking system that connects to the device for locking, storage, display, additional connectivity and/or charging. The kiosk 102 may be tethered to a structure by known methods, such as a security lock cable.

Figure 4:
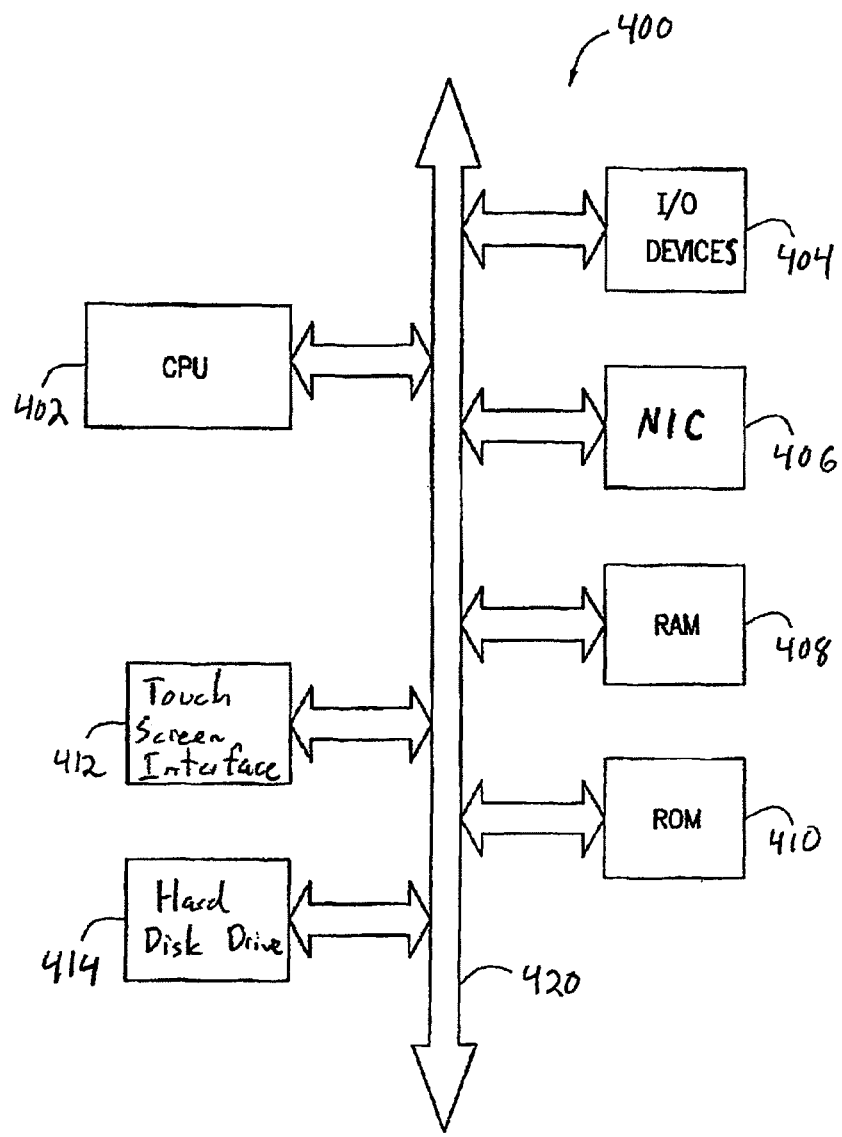
FIG. 4 illustrates an example processor-based computer system of the kiosk.

Internally, the kiosk 102 includes a processor-based computer system 400, such as the one illustrated in the FIG. 4 block diagram. The processor-based system 400 may be a computer system or any other processor system, including computer systems designed for use in mobile devices or tablet computers. The system 400 includes one or more central processing units (CPUs) 402, that communicate with random access memory (RAM) 408, read-only memory (ROM) 410, a hard disk drive 414, a network interface controller (NIC) 406, a touch screen interface 501, and other Input/output (I/O) devices 404 over a bus 420. It must be noted that the bus 420 may be a series of buses and bridges commonly used in a processor-based system, but for convenience purposes only, the bus 420 has been illustrated as a single bus. I/O devices 404 may include features described above in reference to FIG. 3 including the telephone handset 302, the camera 303, or the headphone jacks 304 and may also be connected to the bus 420. The processor-based system 400 also includes ROM 410 which may be used to store a software program. Portions of the software program may also be stored on the hard disk drive 414, and the software program may write and read data such as logs to and from the hard disk drive 414. A NIC 506 handles incoming and outgoing network communications, such as IP communications via Ethernet.

The hard disk drive 414 of the kiosk 102 optional, as the device could be configured to utilize network storage instead. When configured to utilize network storage, the kiosk 102, upon being powered on, will search the network (which may be a local network) for a server (which may be a local server) to locate a boot image. When a boot image is located, the device will download and run the boot image (a "netboot"). When the device is in this mode, all temporary information after booting is stored in the local memory of the device (RAM 408). Important information, such as logs of user activities, is sent directly to a server (local or remote) for permanent storage.

The kiosks 102 may be configured to communicate directly with servers at the processing centers 150, 250 (illustrated in FIGS. 1 and 2), or they may be networked to communicate with a local server computer at the facility 100 that coordinates communication with servers at the processing centers 150, 250. In another configuration, they may communicate with a server at a location remote to both the facility 100 and the processing centers 150, 250. The processor-based computer system 400 may run an operating system such as the Linux operating system, or may be configured with a custom operating system. Although the FIG. 4 block diagram depicts only one CPU 402, the FIG. 4 system could also be configured as a parallel processor machine for performing parallel processing.

Figure 5:
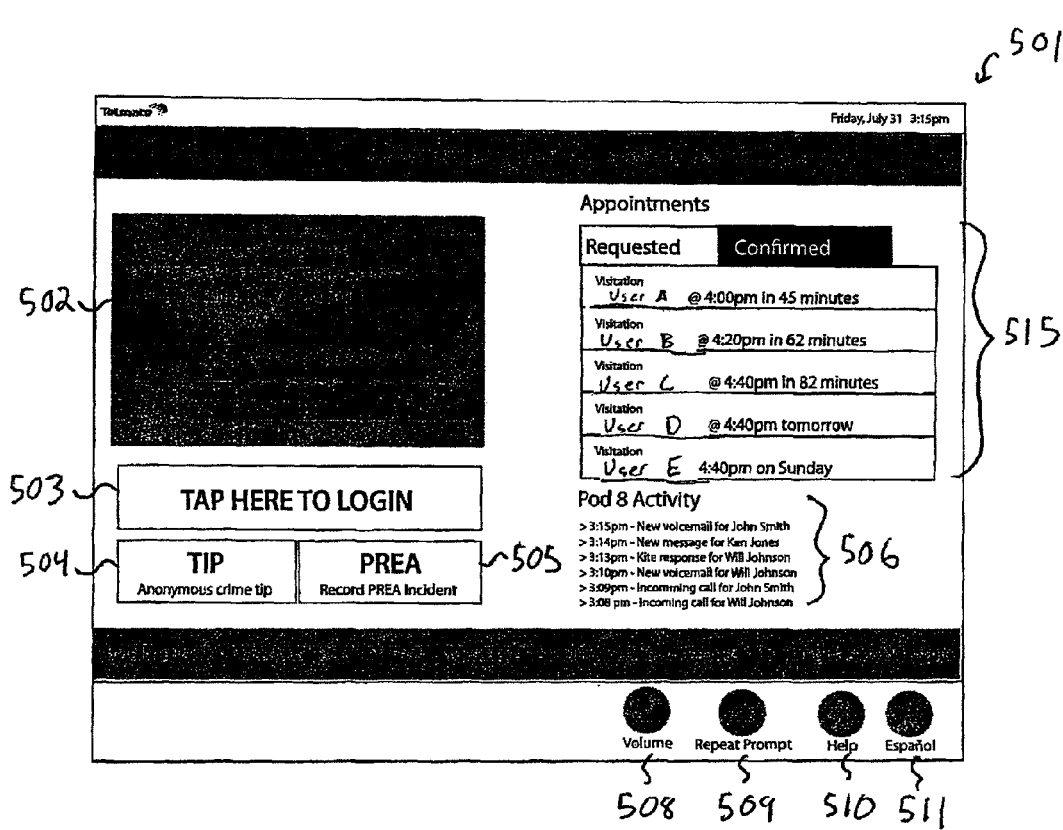
FIG. 5 illustrates an example idle screen of a kiosk interface described herein.

FIG. 5 illustrates an example idle screen 501 of the kiosk interface (i.e., touch screen 301). The idle screen 501 is displayed when no resident has logged on or reserved the system for use. The kiosk interface may display a video 502 of a handset being lifted, a finger touching the screen, and a headset being plugged into the audio jacks, which instructs the resident how to interact with the kiosk 102. The video 502 may also display advertisements or other facility messages.

Three primary interaction options are presented on the idle screen 501. First, a resident can select the login icon 503 to log in to the system. The login procedure is described in more detail below in reference to FIG. 7. Second, a resident can select the tip icon 504 to submit an anonymous crime tip without logging in. Once this icon 504 is selected, the resident is presented with the ability to type or record a crime tip that is forwarded to the appropriate authorities. Third, a resident can select the PREA icon 505, which is used to report an incident under the Prison Rape Elimination Act (PREA). As with crime tips, these incident reports are prepared anonymously and forwarded to the appropriate authorities. Accordingly, the resident is not required to log in for some functionality.

The idle screen 501 also displays an appointments schedule 415, which shows reservations of the kiosk 102. Facility residents are able to use the kiosk 102 to reserve use of the kiosks at certain times, as is discussed in more detail below. The appointments schedule 415 shows when this particular kiosk 102 is reserved. The "Requested" tab shows requests submitted by inmates, and the "Confirmed" tab shows reservations that have been confirmed by the appropriate administrative staff. Requested reservations may be transmitted to administrative staff, enabling staff to view and approve the reservations using a web interface. Alternatively, the approval of reservations can be automated, so that each resident is permitted to make a certain number of reservations within a predefined time period. The activity display 506 shows recent activity for a particular kiosk 102 or group of kiosks 102.

Other features on the idle screen 501 include a scroll 507 that can display various facility messages, such as facility bulletins, set by an administrator. The scroll 507 can also be used to display advertisements or information about features of the kiosk 102. Icons 508-511 at the bottom of the display are persistent icons that are displayed on most or all screens of the kiosk interface. A resident can select the volume icon 508 to change the volume of the speakers, headphones, or handset. Selecting the repeat prompt icon 509 causes the system to replay the last voice prompt. The help icon 510 takes a resident to a help menu, which may include interactive help with audio and video instructions. The language icon 511 changes the language of the text displayed on the kiosk 102. In the illustrated example, the language icon 511 can be selected to switch the language to Spanish, but the language icon 511 may allow switching between additional languages such as French or Russian.

Figure 6:
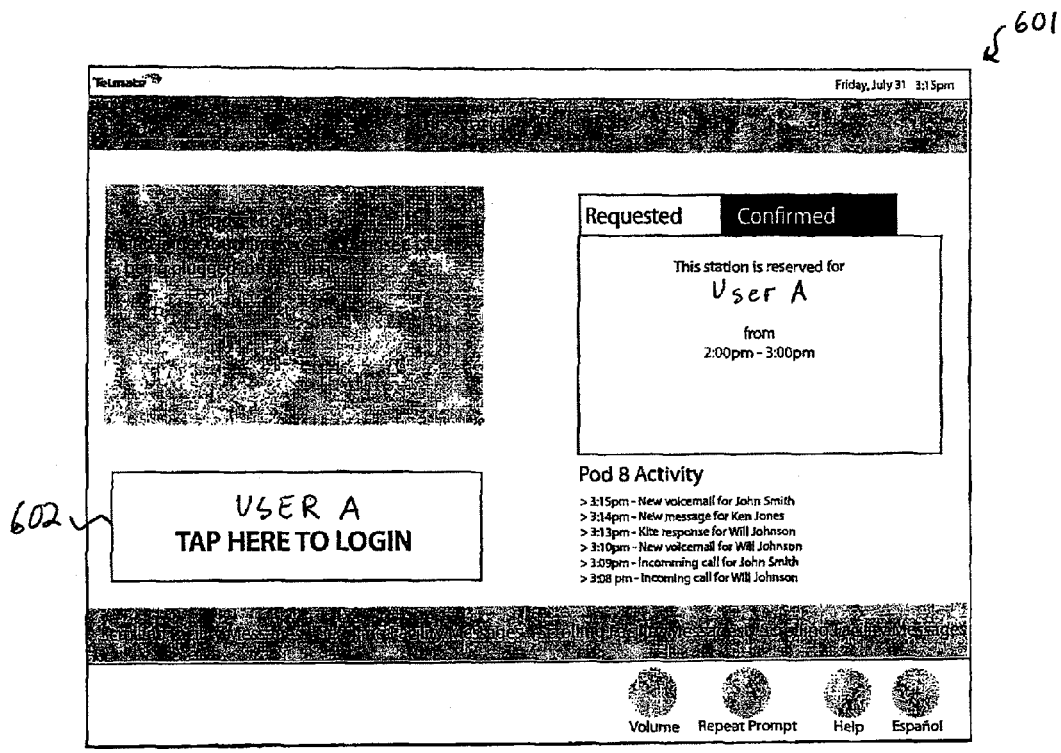
FIG. 6 illustrates an example reservation screen of the kiosk interface.

When a kiosk 102 has been reserved, a reservation screen 601 is displayed on the kiosk interface, as illustrated in FIG. 6. In the illustrated example, the resident's name is displayed in an icon 602, which instructs the resident to log on. When a kiosk 102 has been reserved, only the resident with the reservation can log on. If another user is already accessing the system when there is an upcoming reservation, the current user is warned of the upcoming reservation via messages displayed on the kiosk 102. Warnings can be displayed in several intervals, for example 5 minutes, 1 minutes, and 20 seconds prior to a scheduled appointment time. Once the scheduled time arrives, the current user is automatically logged off of the device.

Figure 7:
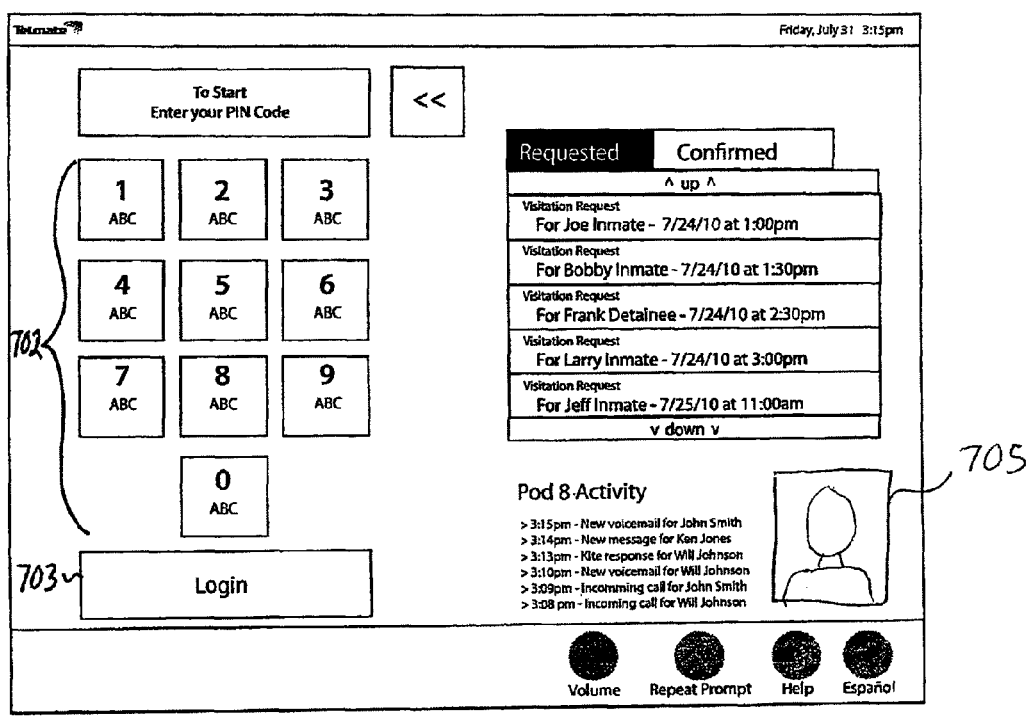
FIG. 7 illustrates an example login screen of the kiosk interface.

FIG. 7 illustrates a login screen 701 of the kiosk interface. At the login screen 701, a resident is requested to enter a personal identification number (PIN) using a virtual key pad 702 and login icon 703 to log in to the kiosk 102. Each resident at a facility is given a unique personal identification number to ensure security. During the log in process, the camera of the kiosk 102 is activated. An image or video of the resident logging on is recorded, and stored along with a record of the attempted log in. Administrators can later view images or video of these log in attempts. In addition, the kiosk 102 will use facial detection software to ensure that a face is present in the camera field of view. If no face is present (for example, because a resident is blocking the camera with their hand or other obstruction), the system will not permit a log in to be completed. During a resident's log in, the kiosk 102 may display a video feed 705 on the login screen 701, providing a visual reminder to the resident that the images are being recorded. Additional secondary verification systems (such as voice biometrics and individualized facial recognition) may also be utilized, as illustrated in FIGS. 7-8.

Figure 8:
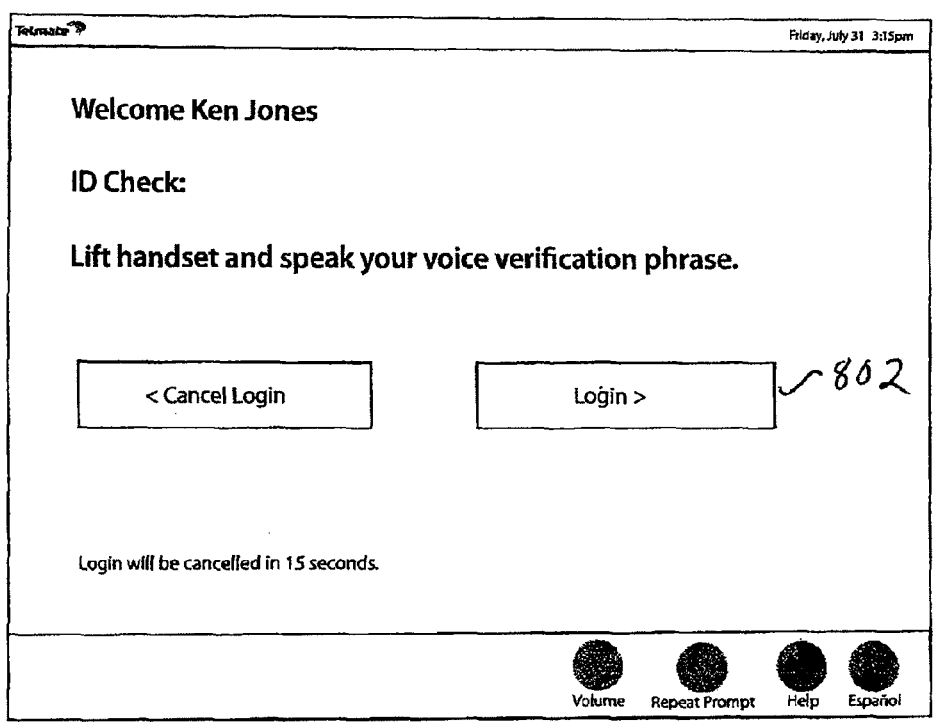
FIG. 8 illustrates an example voice verification screen of the kiosk interface.

FIG. 8 illustrates a voice verification screen 801 of the kiosk interface. The voice verification system utilizes a voice ID audio clip that was previously recorded by the facility resident. The pre-recorded clip can be recorded under the supervision of facility administrative staff, and may be, for example, a recording of a resident stating their name or another short phrase. At the voice verification screen 801, the facility resident is requested to lift the telephone handset and speak the pre-recorded phrase. After speaking the phrase, the resident selects the login icon 802 to log into the system. The voice verification system records the phrase spoken by the facility resident, and compares a digital signature of the audio to the pre-recorded audio clip. The pre-recorded clips may be created and stored locally at the kiosk 102 (not shown) or may be created by another mechanism and stored at a database 258 of the processing center 250 (as illustrated in FIG. 2). Accordingly, the comparison may be made by software on the kiosk 102 or at the processing center 250. If the recorded audio matches the pre-recorded audio clip, the resident is granted access.

Figure 9:
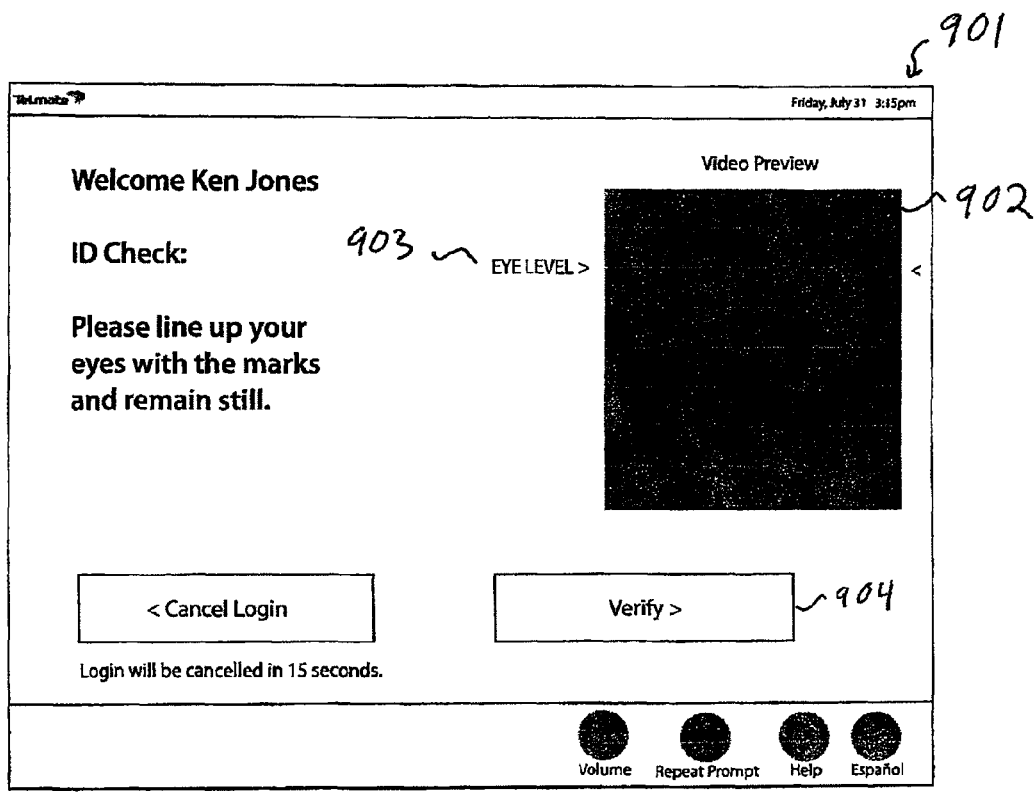
FIG. 9 illustrates an example facial recognition verification screen of the kiosk interface.

FIG. 9 illustrates a facial recognition verification screen 901 of the kiosk interface. Facial recognition verification may be used in combination with one or more of the other verification systems, including the PIN verification and the voice verification. On the facial recognition verification screen 901, the video preview window 902 displays the field of view of the camera. The display requests that the resident line up their eyes with the eye level marks 903 displayed next to the video preview window 902. This ensures that an appropriate image is captured for verification. When the resident selects the verify icon 904, facial verification is performed.

As with the voice verification system, the facial verification processing may be performed locally at the kiosk 102 or may be performed at the processing center 150. In either case, the facial verification processing includes comparing an image captured by the camera 303 of the kiosk 102 with a pre-stored image of the resident. The facial recognition system uses facial "landmarks" generated by mathematical formulas to present a score which indicates a likelihood that the captured image matches the pre-stored image. If the images match to a sufficient degree, the verification is approved and the resident is granted access to the system. If the images do not match, the system may store the captured image and other usage details for review by administration officials.

Figure 10:
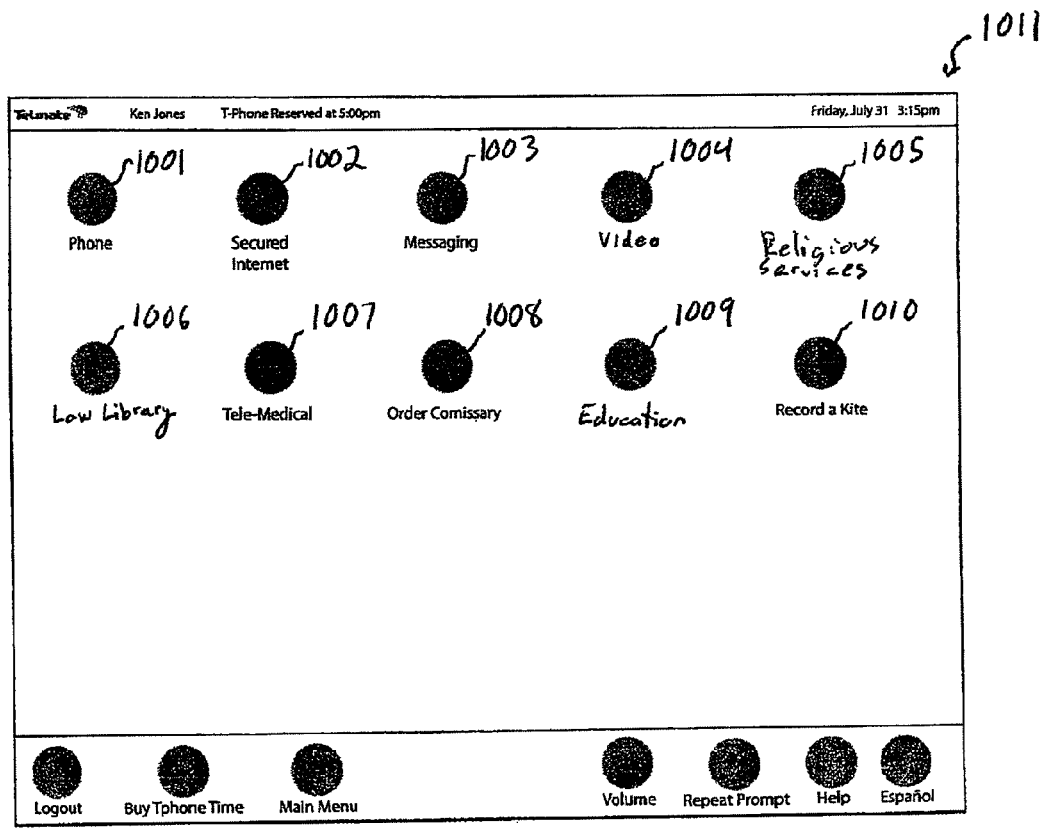
FIG. 10 illustrates an example main screen of the kiosk interface.

Once a resident has logged into the system, they are presented with a main screen 1011 of the kiosk interface, illustrated in FIG. 10. From this screen, a resident can access all other features of the kiosk 102. Features can include phone calling, internet access, text messaging, video conferencing and messaging, religious services, law library access, telemedical sessions, commissary ordering, educational materials, Kite recording, and access to other facility services. As such, the screen 1011 can have a phone icon 1001, an internet icon 1002, a messaging icon 1003, a video icon 1004, a religious services icon 1005, a law library icon 1006, a telemedical icon 1007, a commissary icon 1008, an education icon 1009, and a kite icon 1010. The icons in FIG. 10 are a sampling of possible icons, but other icons may be provided for additional features. The options available at the main screen 1011 can be configured by facility administrators, and each resident can be configured with a unique profile limiting the available options to some sub-set of all of the options. Accordingly, certain restrictions can be placed on individual residents of the facility due to misuse of the system or for other reasons.

Communications features are central to the kiosk functionality. Residents can communicate via voice, video, or text messaging. To initiate a voice communication, a resident can select the phone icon 1001 from the main screen 1011. The resident is then presented with a phone screen 1111, such as the one illustrated in FIG. 11. Depending on the configuration preferred by a facility, additional authentication may be performed prior to the voice communication (voice authentication, facial recognition authentication, or other forms of authentication).

Figure 11:
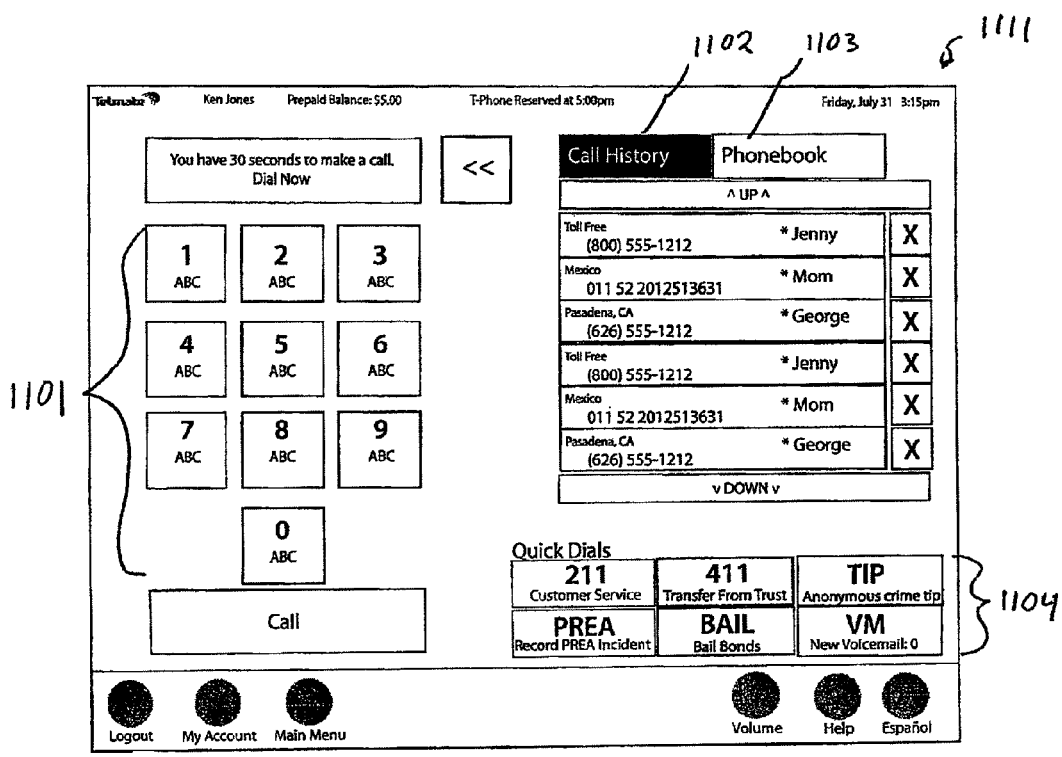
FIG. 11 illustrates an example phone screen of the kiosk interface.

As shown in FIG. 11, at the phone screen 1111 a resident is presented with a virtual key pad 1101 that can be used to dial a telephone number. The resident can also select a number using the call history 1102 or phonebook features 1103. The call history 1102 is automatically constructed from a resident's history of incoming and/or outgoing calls. The phonebook can be edited by the resident. Quick dials 1104 are presented for frequently used administrative numbers such as customer service, funds transfer, anonymous crime tip, PREA reporting, bail bonds, or voicemail. A resident's call is routed, via the interne, to a processing center such as processing centers 150, 250 illustrated in FIGS. 1 and 2. Processing at the processing centers determines whether the resident has permission to make calls to the dialed party and whether the resident has sufficient funds, and either allows or denies the call. The processing center 150, 250 can also log and record the call, as appropriate. If the call is approved, it is processed according to the descriptions above in reference to FIGS. 1 and 2.

From the phone screen 1111, a resident can access voicemail using the quick dial icon 1104. FIG. 12 illustrates an example voicemail screen 1201. As shown in FIG. 12, voicemail messages can be displayed visually in a list 1202. The voicemail can be stored locally on the kiosk 102 or may be stored at a processing center (such as processing centers 150, 250 illustrated in FIGS. 1 and 2). The resident may be permitted only a limited number of playbacks of voicemail recordings, indicated by icons 1204 displaying a number of remaining playbacks. Limits on playbacks may be optionally removed, depending on the desires of a particular facility. Optionally, the kiosk 102 may be configured so that a voicemail may be played more than a predetermined number of times only after a fee is paid. The call back icon 1203 allows the resident to return the call of the individual displayed on the list 1202. Voicemail messages are stored permanently on the server of the processing center, so that administrative staff always has an archive of voicemails received by the residents.

Figure 13:
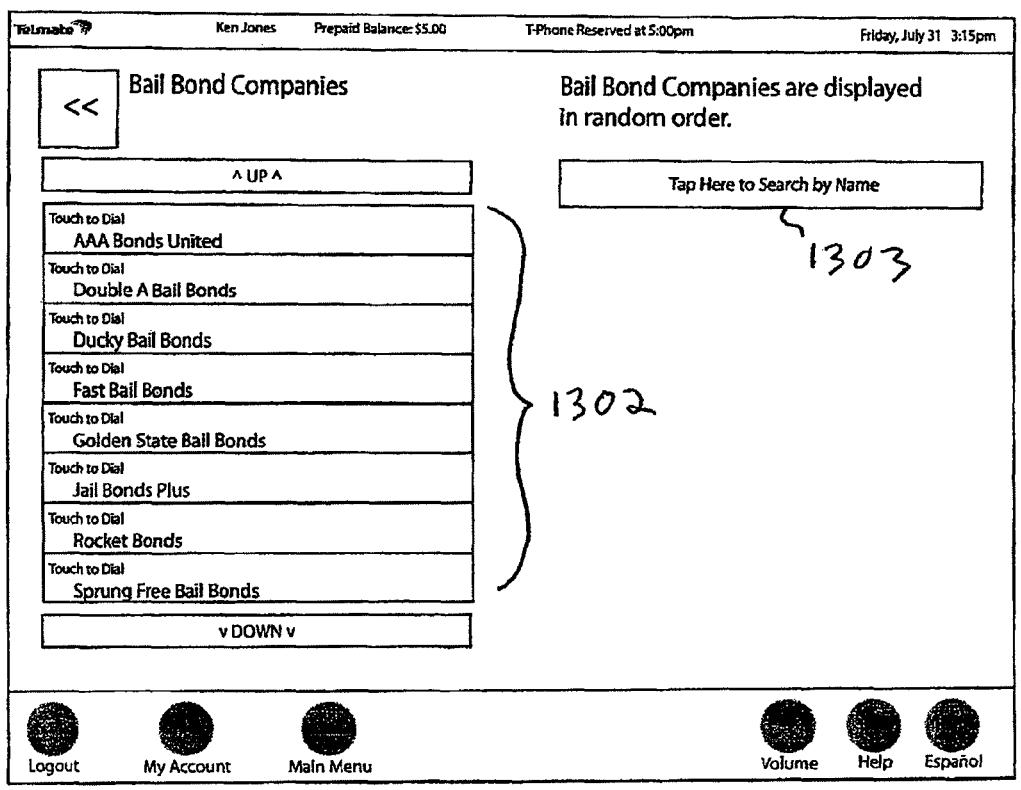
FIG. 13 illustrates an example bail bonds screen of the kiosk interface.

A resident may also access a bail bonds screen 1301 from the phone screen 1111. The bail bonds screen 1301 is displayed in FIG. 13. As shown in FIG. 13, available bail bond companies may be displayed in a random order in a list 1302. It should be appreciated that the companies can be listed in alphabetical or other orders too. The resident may select from this list or may select the search icon 1303 to search for a bail bond company by name. If the search icon 1303 is selected, the resident can enter the name of a bail bond company using an on-screen keyboard, and a database of known bail bond companies will be searched.

The kiosk 102 also enables incoming calls. An outside caller, such as parties 180, 181, 280 in FIGS. 1 and 2, can dial a number assigned to one or more facilities and, using an IVR with dial-by-name functionality, locate the inmate they wish to call. Alternatively, the resident may have a personalized number assigned, for an additional fee. If the resident has permission to receive incoming calls from the calling party, and if the resident or the outside caller has sufficient funds in their account, then kiosks 102 that are identified as being located in the area that the resident is housed in will play an alert tone. Optionally, the schedule of the resident can be stored in the system and different kiosks 102 may be activated according to the predicted location of a resident based on the schedule. When there is an incoming call, the kiosk 102 would display the resident's name, and optionally, a caller ID for the incoming call. The kiosk 102 may also audibly announce the incoming call and the name of the receiving party (this may be enabled or disabled on a per-facility basis).

To answer the call, the resident would need to log into a kiosk 102 using the login procedure described above. Only the resident associated with the called number will be permitted to answer the call. During the resident's log in, a voice message can be played to the outside caller, so that they are informed that the resident is in the processing of logging in. If a resident does not log in after a predetermined period of time, the caller is prompted to leave a voicemail message.

When there are multiple incoming calls received simultaneously, the kiosk 102 will announce the names of the multiple calling parties. The login screen would display the names of the calling parties or the called parties, and the resident would select the appropriate name from the screen and then proceed to the login procedure.

The incoming call can also be a video call. In this case, the caller would log into an internet website providing a video conferencing interface (described in more detail below). As with voice calls, an alert tone would be played by one or more kiosks 102 in the vicinity of the resident, and the resident would be prompted to log in to receive the video call.

Using the kiosk 102 for telephone communications has significant advantages over ordinary telephone systems. The touch screen of the kiosk 102 can display extra information, such as caller ID, available funds, time left on a call, or help options. The touch screen can also display advertisements or facility messages during the call. Additionally, through integration with the processing centers 150, 250, additional security, logging, monitoring, and recording functionality is enabled.

The kiosk 102 also provides secure text-based messaging between residents of the facility and the public. A resident can access text-based messaging functionality by selecting the messaging icon 1003 from the main screen 1011 illustrated in FIG. 10. On the messaging screen (not shown), the resident can select to retrieve received messages or to compose and send a new message. To send a new message, the resident types a recipient name or selects a name from an address book similar to how text messaging is done on cellular phones, smart phones, and PDAs. An on-screen keyboard allows the resident to type a message. Residents can be charged per-message or by alphanumeric character, as desired by the facility.

Messages sent by residents are transmitted to a processing center (such as processing centers 150, 250 of FIGS. 1 and 2) where they are stored. The processing center sends an email or SMS message to a pre-registered email address or cellular phone number of the recipient, notifying that they have an available message. Optionally, messages may include photo or video attachments taken with the kiosk camera. Attachment functionality may be enabled or disabled based on facility preference. The message itself is not displayed in the email or SMS message, the message is only available for viewing when the outside user logs into a secure website. This ensures secure delivery of the message. For additional security, the messaging functionality may be set so that messages viewed on the website cannot be forwarded or copied from the secure website. This provides the facility with an additional level of control over the messages. Thus, while the system resembles email, the messages are not accessible via email, and can not be copied or forwarded like email.

All messages transmitted via the system are logged at the processing centers 150, 250 (as illustrated in FIGS. 1 and 2). Even messages that are deleted by a resident our outside party can be stored for audit and investigative purposes. Additionally, messaging may be restricted on a per-resident or group basis: prohibiting particular inmates from sending or receiving messages to all, or just some, persons, as well as prohibiting some outside parties from messaging specific inmates. An outside party may need to have an account with the system, and may need to have proper funds or credits in the account and pass an ID verification check, which may include the verification methods above (PIN number, voice identification and/or facial recognition).

Figure 14:
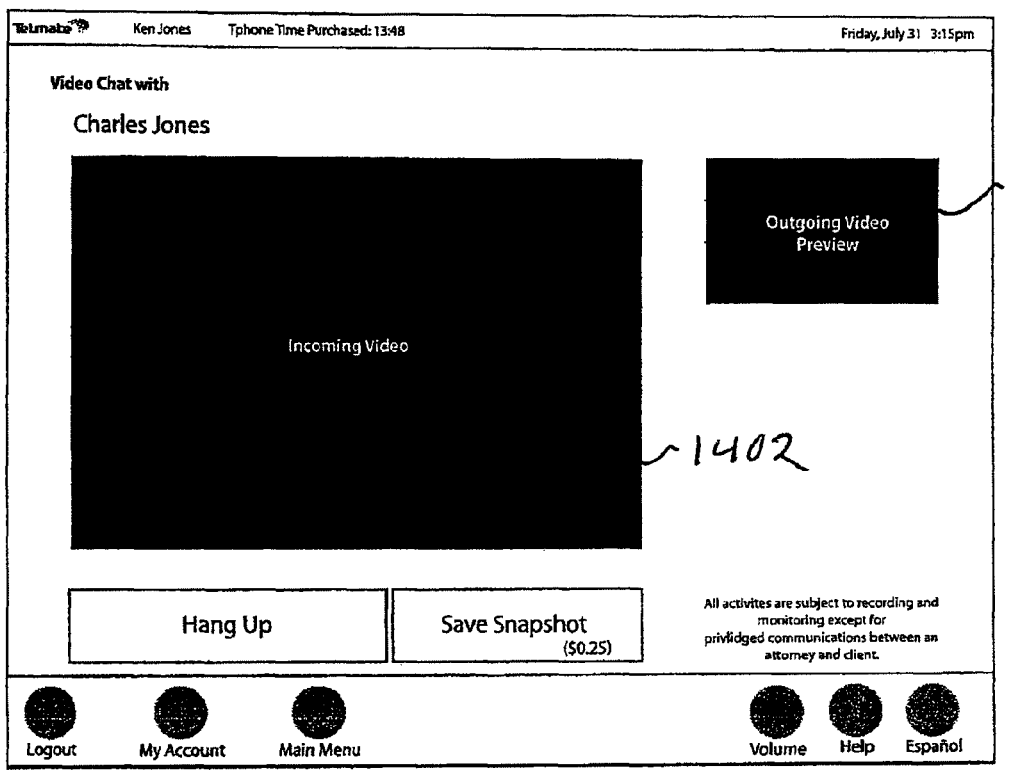
FIG. 14 illustrates an example video conferencing screen of the kiosk interface.

The kiosk 103 also provides secure video conferencing and video messaging. A resident can access video conferencing functionality by selecting the video icon 1004 from the main screen 1011 illustrated in FIG. 10. FIG. 14 illustrates an example of a video conferencing screen 1501. Incoming video is displayed in a video window 1502, and a resident can view outgoing video in a smaller window 1503. The video conferencing feature may also allow residents to save a snapshot of the incoming video. The snapshots may incur an additional charge to the resident's account.

Full motion color video conferencing can be provided between a resident in a secure facility and either (a) a remote party connected over the internet with a standard internet browser or (b) a party at another kiosk 102 located in the same or at another facility. For example, kiosks 102 may be located in a visitor's area of a facility.

An outside party can connect to an internet website that provides video conferencing with a facility and log in with a pre-registered account or create a new account. The outside party may need to have an account with the system, and may need to have proper funds or credits in the account and pass an ID verification check, which may include the verification methods described above (PIN number, voice identification and/or facial recognition). The remote party can add funds to his/her account to cover the cost of video conferencing, which may be charged on a per-session or per-minute basis, as set by the facility. From the website, the outside party can either schedule a call or connect to a pre-scheduled call. The outside party can also attempt a live call to the facility (as described above). To participate in the video conference, the outside party would need a computer with an internet connection, a web camera, a microphone, and speakers (or headset).

An outside party can also use another kiosk 102 located in the same facility. As with the internet website, the outside party would log into a visitation kiosk 102 and could add funds to an account to cover the cost of video conferencing (as mentioned above, a resident may also be allotted a certain amount of free visitation time). The outside party can either schedule a call or connect to a pre-scheduled call. It is also possible to route communications from one facility to another, so that a party at a first facility can communicate with a resident in another. When two kiosks 102 in the same facility are used for a video conference, the video may be transmitted through a local media server at the facility, instead of being routed through servers at a processing center 150, 250 as illustrated in FIGS. 1 and 2.

Facial detection software is utilized to provide additional security and to monitor use of the video conferencing feature. The facial detection software may be executed locally on the kiosk 102, or may be executed at processing centers that are routing the communications. The facial detection software uses video analysis of individual frames of video to detect that a human face is present inside the video frame. If a face is not detected, the system blurs or otherwise obscures the image. This prevents inappropriate images from being transmitted.

The facial detection software may also periodically pass images to a facial verification system. The facial verification system compares a detected face image with a face image stored in a database. If the detected image does not match the pre-stored image, a warning is displayed to prompt the resident to face the camera so that a second image can be captured. If the second image does not match or a face is not detected, the account will be logged off the system. This can be logged as a violation at the processing center. The facial verification ensures that the logged-in resident has not allowed another resident to use the account after logging in. The facial detection software may also detect when a second face is present in the frame, and may blur or disconnect a conference when a second face is present.

The facial verification feature can be active even when the resident is not intentionally using the camera, such as when the resident is using entertainment or text messaging features. Images taken periodically and compared against pre-stored images ensure that only authorized residents are accessing system features. Facial verification may also be used on video being captured by an outside user during a video conference or video message. Outside parties that wish to use the video conferencing features may be required to register a facial image with their account. This ensures that only authorized individuals are communicating with a resident during a conference.

Figure 15:
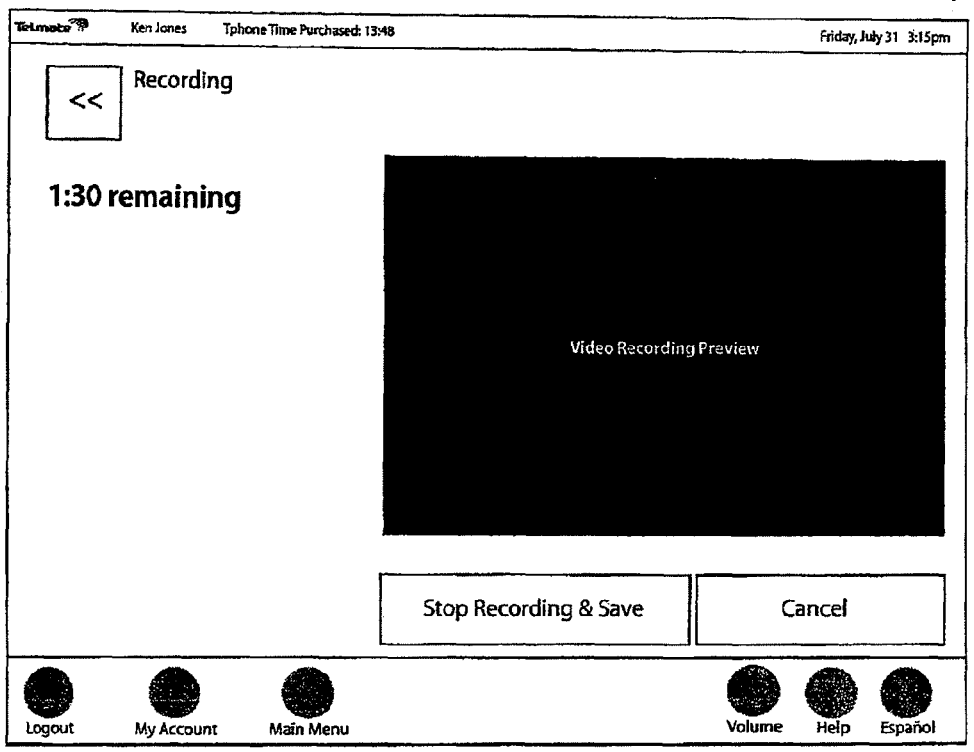
FIG. 15 illustrates an example video messaging screen of the kiosk interface.

Video messaging allows a resident and outside party to send video messages to one another using the kiosk 102, in a similar manner to the text-based messaging described above. An example video messaging screen 1601 is illustrated in FIG. 15. An outside party receiving a video message would receive an SMS or email message alerting them to the availability of the video message. As with the text-based messaging, the outside party would log into a secure website to view the message. Video messages can be charged on a per-message or per-minute basis.

Another option available from the main screen 1011 of the kiosk 102 (illustrated in FIG. 10) is a tele-medical session 1007. This feature allows residents to participate in a video conference with a medical professional or record video that can used to pre-screen patients before they are allowed to schedule an appointment with a doctor. All video can be logged to allow facility staff to review and follow up on any potential medical situations. Optionally, the facial detection features described above may be disabled for tele-medical sessions.

By selecting the religious services icon 1005 of the main screen 1011 (illustrated in FIG. 10), a resident can access video and audio recordings of religious services. The resident can also access religious texts. The law library icon 1006 (illustrated in FIG. 10) provides access to electronic versions of law books and statutes in a searchable format. Locally-relevant law books may be provided (i.e., the laws for the state the facility is located in). Law libraries may be stored on servers at the processing center, or may be accessed via publicly available websites.

Selecting the education icon 1009 of the main screen 1011 (illustrated in FIG. 10) provides a resident with access to various educational material. Facility rules and procedures are presented for text-based browsing. These can include handbook material covering facility rules, procedures, and other information. The educational function may also provide access to facility orientation videos that explain facility operations, rules, and procedures. Access to this section can be made available without charge, but with limited viewing time to avoid monopolizing the kiosk 102. Distance learning programs may also be offered as video and text coursework, for free or based on a charge, depending on facility rules.

Selecting the commissary icon 1008 (illustrated in FIG. 10) from the main screen 1011 allows a resident to place orders from a facility commissary by browsing a collection of items and making selections. The resident can purchase items using a shopping cart metaphor as implemented on interne shopping websites. The resident must have available funds in their account to purchase items from the commissary. Time spent browsing the commissary can be limited to a predetermined number of minutes per day, so that the function can be provided free of charge while not monopolizing the kiosk 102.

Selecting the Kite icon 1010 provided on the main screen 1011 (illustrated in FIG. 10) allows a resident to prepare Kite messages. Kites are a form of written communications in jails, and typically include requests for medical treatment, complaints or concerns about housing, commissary, food, and the facility itself. The Kite menu is available to all residents, and does not require funds to access. Kites are recorded using video from the camera 303, and audio from the telephone handset 302 of the kiosk 102. The resident stands in front of the device and records their request verbally, and video (with audio) of the kite requests is recorded. When recording a video, the kiosk 102 will indicate when the video is starting and will display a preview window during the recording.

Figure 16:
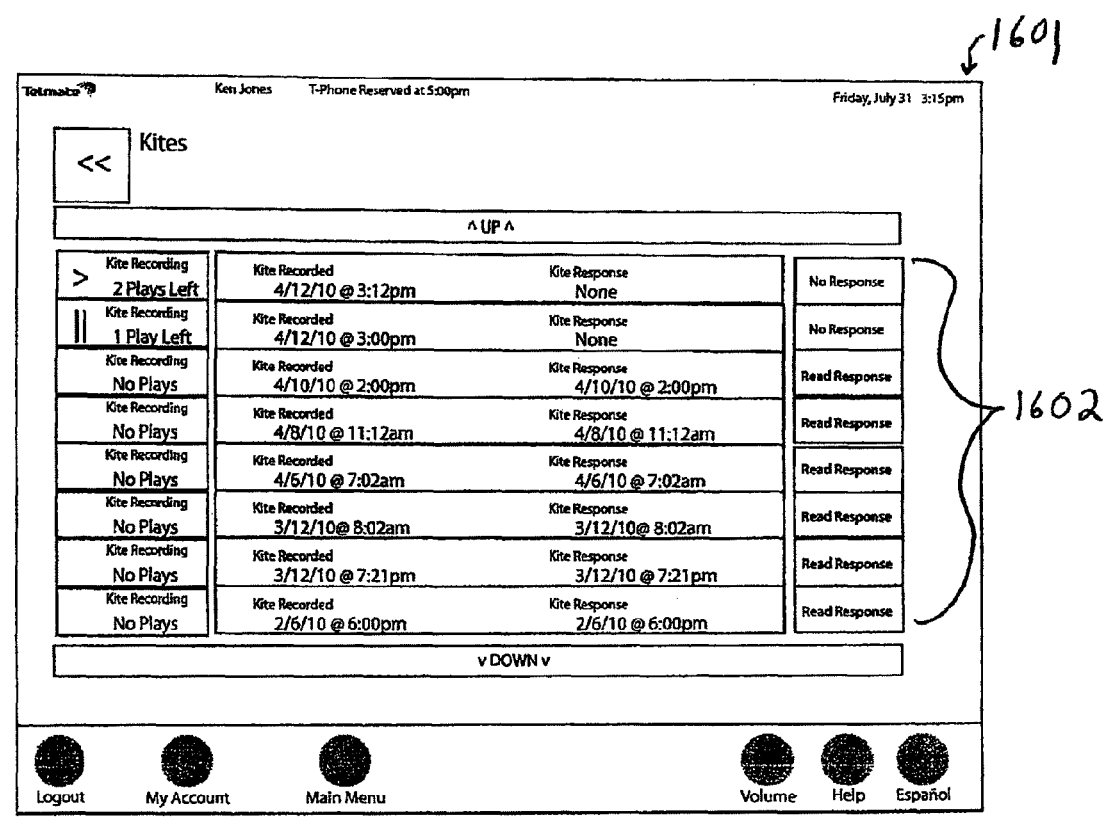

The resident can use the kiosk 102 to receive a history of all of their Kite requests and their current status, as illustrated on the example Kite screen 1701 illustrated in FIG. 16. A resident can click the read response icons 1702 to read responses to past kite requests. When the resident submits a new Kite, the video message becomes available for review by facility staff using the web interface of the central platform. Kite messages are presented to administrators as a queue of video messages to view and respond to. A text-based response can be prepared for viewing on the kiosk 102 by the resident. Any action undertaken in connection to the Kite (viewing, responding, changing status, etc.) can be logged in a Kite audit trail and can be reviewed by facility administrative staff.

Figure 17:
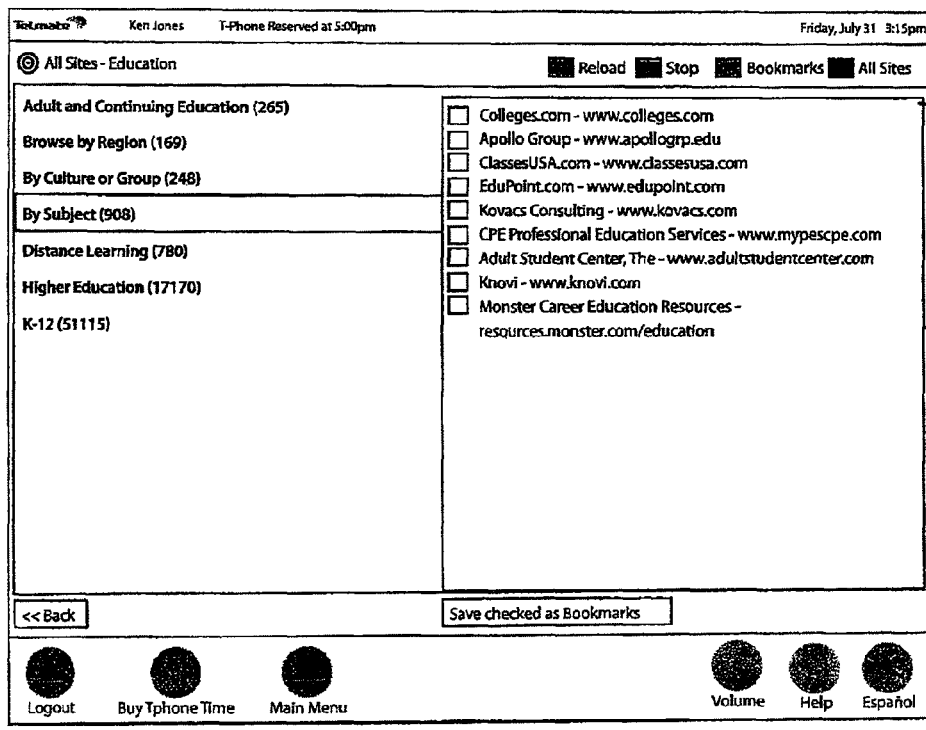
FIG. 17 illustrates an example internet screen of the kiosk interface.

The internet icon 1002 on the main screen 1011 (illustrated in FIG. 10) provides access to information on internet web sites. All traffic through the internet browser is routed through a proxy server hosted at the processing center or locally at the facility. The proxy server can block any site that is not on a pre-approved list of websites. The default behavior is to block access to a website, and only a site added to a whitelist are reachable. To facilitate browsing of approved sites, the resident may be presented with a list of categories and pre-approved sites. By selecting a category, the resident is presented with a list of sites in that category. FIG. 17 provides an example of an Internet screen 1701 showing available websites 1702 in an Education Category 1703. Category 1703 shows certain categories (e.g., Adult and Continuing Education) but is not so limited. Any category approved by the facility can be displayed. The Internet browser can provide access to the full text of books in the public domain and made available through public websites. Streaming television may be accessed through pre-approved sites.

The only method of text input for the internet feature is via an on-screen keyboard on the kiosk display. The keyboard may be enabled/disabled on a per site basis. This can be used to prevent residents from entering comments or messages on sites where they can not be monitored. For example, a resident may be permitted to view stories on a news site, but not permitted to enter comments onto the site.

For additional security, the resident may be blocked from entering their own internet address, and the only method of browsing may be the selection of pre-approved sites. The proxy server can be configured prevent a resident from obtaining content from a site that is not on a pre-approved domain.

All actions taken on a kiosk 102 are logged and recorded in the resident's records that are stored at the processing center. Examples of information logged in an audit trail include each session start, location of the session (e.g., kiosk number), length, and audio or video recordings of activities. The system can also log phone calls placed, including call destination, length, billing method, and a recording of the audio. Video conferences can also be recorded (at both sides of the conference), and the time, length, and billing method are logged. Text messages sent and received can be stored, along with message text, time, and destination. The log can contain a list of every internet site and visited, at what time, and for how long. All visitations attended, requested, or denied, and all interactions with outside parties can also be logged. All applications and services accessed can be logged, including the time started and the length used. As with the other features, the logging capabilities can be configured on a per-facility basis, allowing each facility to customize the level of reporting and monitoring, as appropriate. Administrators can access logs or configuration settings using a web interface provided by the processing center 150, 250 (illustrated in FIGS. 1 and 2).

All recorded communications are logged and made available for review by administrative staff. Recordings (audio, video, and text) are associated with the resident and the destination party. Playback of recordings is made available through an administrative web interface provided by the processing center. Recordings and text are also available for remote download via the web interface provided by the processing center.

The described system can charge residents for access on a timed (per minute) basis. The billing rate can be adjusted based on the activity and the time of day. For example, video calls at 6 am may be $0.20/min and at 8 pm they may be $0.50/min. Each resident has their own account, and funds are deducted from their account as they use the kiosk 102. The kiosk 102 may display a running total of funds or remaining time for a particular activity. When a resident launches a new application on the kiosk 102, they are informed of the current rate for that activity. Pricing can be set using the administrative web interface.

Additionally, the system may support multiple accounts for different features. For example, a commissary account may be separate and external from a prepaid calling account or an entertainment account. The kiosk 102 can provide the ability to transfer funds from one account to another, if enabled by administrative staff.

Figure 18:
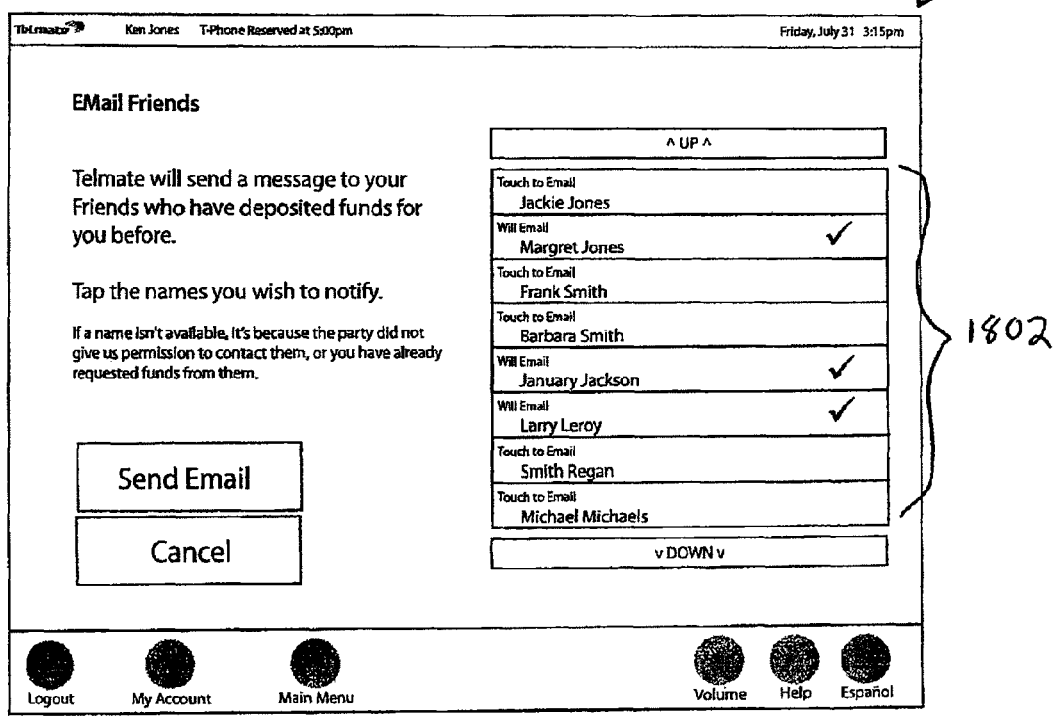
FIG. 18 illustrates an example fund request screen of the kiosk interface.

If a resident has exhausted available funds, a prompt is displayed allowing the resident to send a pre-formatted email to contacts that have been associated with them. An example fund request screen 1801 is illustrated in FIG. 18. The associated contacts 1802 would be individuals that have in the past provided funds to the resident's account. The pre-formatted email would request additional funds. The system can restrict the number of requests that are allowed in a given time period. For example, the system may only allow one request to be sent to each associated contact every 30 days. The system will only allow one outstanding request per contact to avoid harassment. The receiving party can reply to the email to have their name blocked at any time. Since the message is pre-formatted, the resident cannot use the fund request email for any other purpose.

The kiosk 102 also allows a resident to request a visitation appointment. A resident can request a visitation with anyone that has a system account and has an established relationship with the resident. For example, the resident can request a visitation appointment with individuals that have made a funds deposit for the resident or have communicated via phone, text, or video. The resident can optionally pay for both sides of the visitation using their available funds, or only their own side, or they can request that the outside party accepting the visitation pay for both sides. The appointment request message is submitted, and if approved by administrative staff, is forwarded to the visitor by SMS or email messaging. The visitor can proceed to schedule the appointing using a web interface accessible via the Internet. Alternatively, a visitor can initiate a visitation request using the website, and it can be forwarded to the resident for scheduling via the kiosk 102. When a visitor requests a visitation, they may be required to pay for both sides of the visitation.

Appointment reminders may be provided via the kiosk 102 in increments leading up to the appointment (e.g., 2 days, 1 day, and 1 hour before an appointment). The resident must log in to an available kiosk 102 during their visitation window to participate in the appointment. If the resident has not logged in after a predetermined period of time, the appointment may be canceled.

Visitation fees can be set to accrue at both ends of the conversation. For example, the resident may pay a rate based on the minute rate in effect at the current time, and the visitor would pay the rate at their location. Visitation fees may be pre-paid at the time of reservation.

Visitation rules can be set on a per-facility basis. For example, facilities may limit the number and times of visits on a global or a per-resident basis. The rules are defined in the administrative web interface and can be selected or changed at any time. On-site visits can be conducted through kiosks 102 in a visitor's area of the secure facility. If required at the facility, these visits may be provided without charge. A visitor may, however, elect to exceed an allotted free time by paying for additional time, if permitted by the configuration settings of the facility. Funds can be deposited locally via the kiosk 102, or by accessing funds in a pre-existing account.

The kiosk 102 may also provide remote monitoring capabilities. By accessing a web interface provided by the processing center 150, 250 (illustrated in FIGS. 2 and 3), an administrator can remotely activate the camera and/or microphone on a kiosk 102. This would enable the administrator to covertly monitor the area within the kiosk camera 303 field-of-view.

The above description and drawings are only to be considered illustrative of specific embodiments, which achieve the features and advantages describe herein. Modifications and substitutions for specific conditions and materials can be made. Accordingly, the embodiments are not considered as being limited by the foregoing description and drawings, but are only limited by the scope of the appended claims.

The invention claimed is:

1. A system for providing services to a secure facility, the system comprising:
   a kiosk located at a secure facility, the kiosk comprising a processor, display, speaker, microphone, and a camera; and
   a server that communicates with the kiosk via a network connection, the server comprising a server processor, a network interface unit, and a computer memory;
   the kiosk being configured to receive communications from the camera and microphone and transmit audio and video of the communications to the server via the network connection;
   wherein the server records the audio and video and transmits the audio and video to a destination;
   wherein the kiosk is configured to authenticate the identity of a user of the kiosk by verifying log in information entered by the user and also performing a biometric verification;

wherein, after the user identity has been authenticated by the kiosk and during the transmission of the video, the server is configured to periodically extract a frame of the video and perform a check to determine if a face is present in the frame, and the server is further configured to blur the video being transmitted to the destination when the check determines that the face is not present in the frame; and wherein the destination is a device communicating with the server, and the server is configured to authenticate a user of the device.

2. The system of claim 1, further comprising:
a second kiosk located in a visitation area of the secure facility; and
a local server located at the secure facility;
the kiosk being configured to transmit the audio and video to the local server when the communications are intended for the second kiosk located in the visitation area; and
wherein the local server is configured to record the audio and video and transmit the audio and video to the second kiosk located in the visitation area.

3. The system of claim 1, wherein the server is configured to periodically extract a frame of the video and authenticate a face in the frame against a stored identification image of the user.

4. The system of claim 1, wherein during a singular communications session, the kiosk is configured to periodically record a frame of video and transmit the frame to the server, and wherein the server processor authenticates a face in the frame against a stored identification image of the user.

5. The system of claim 1, wherein the kiosk is configured to accept messages input by the user after the user has logged on and transmit the messages to the server, and the server is configured to provide a third party access to the messages.

6. The system of claim 1, wherein the server is configured to receive an incoming call for the user from a third party caller, determine whether the user has permission to receive incoming calls, if the user has permission, transmit the incoming call to the kiosk and at least a second kiosk, and
wherein the kiosk and the second kiosk are configured to, upon receipt of the incoming call, display a screen notifying the user of the incoming call, and prompt the user to input the log in information.

7. The system of claim 1, wherein the kiosk is configured to provide the user with at least two of: access to audio, video, and text of educational material stored on the server and/or the kiosk, access to audio, video, and text of religious material stored on the server and/or the kiosk, and the ability to order items from a list of commissary items.

8. The system of claim 1, wherein the kiosk is configured to receive text-based messages from a server, and to display a notification of an available text-based message on an idle screen of the kiosk.

9. The system of claim 1, wherein the log in information is a personal identification number.

10. The system of claim 1, wherein the biometric verification comprises a facial authentication via the camera.

11. The system of claim 1, wherein the biometric verification comprises a voice authentication via the microphone.

12. The system of claim 1, wherein the server is configured to detect the presence of a second face in the video frame and, while the presence of the second face is detected, the kiosk is configured to blur the video.

13. The system of claim 1, wherein the server is configured to record video in a tele-medical session mode wherein the blurring the video being transmitted to the destination is not performed when the check determines that the face is not present in the frame.

14. The system of claim 1, further comprising a plurality of kiosks located at the secure facility, wherein the server is configured to receive a request for a resident from a caller outside the secure facility, identify one of the plurality of kiosks that is located in an area the resident is housed in using a schedule of the resident, and activate the identified one of the plurality of kiosks to play an alert tone and display the resident's name.

15. A kiosk for providing facility services in a secure manner, comprising:
a computer processor;
a memory connected to the processor via a bus;
a camera connected to the bus for inputting video communications;
a microphone connected to the bus for inputting audio communications;
a speaker connected to the bus;
a touchscreen display connected to the bus; and
a network interface connected to the bus for communicating with a server via a network connection,
wherein the kiosk authenticates a user by receiving personal log in information and comparing the received personal log in information against a known personal log in information associated with the user, verifies the user's identity using a biometric verification, records audio and video communications and transmits the audio and video communications to the server, and provides access to internet web pages via a web proxy, and
wherein, after the user has been authenticated and during the transmission of the video, the kiosk is configured to periodically extract a frame of the video and perform a check to determine if a face is present in the frame, and the kiosk is further configured to blur video being transmitted to a destination when the check determines that the face is not present in the frame.

16. The kiosk of claim 15, wherein the kiosk provides the user with at least one of: access to audio, video, and text of educational material; access to audio, video, and text of religious material; the ability to order items from a list of commissary items; the ability to reserve times for using the kiosk; and the ability to send text messages to third parties.

17. The kiosk of claim 15, wherein the personal log in information is a personal identification number.

18. The kiosk of claim 15, wherein the biometric verification comprises a facial authentication of an image captured by the camera.

19. The kiosk of claim 15, wherein the biometric verification comprises a voice authentication of an audible phrase recorded using the microphone.

20. The kiosk of claim 15, wherein the kiosk is configured to detect the presence of a second face in the video frame and, while the presence of the second face is detected, the kiosk is configured to blur the video.

21. The kiosk of claim 15, wherein the kiosk is configured to record video in a tele-medical session mode wherein the blurring the video being transmitted to the destination is not performed when the check determines that the face is not present in the frame.

22. A method of monitoring use of an interactive kiosk during a video transmission, comprising:
authenticating the identity of a user of the kiosk by verifying log in information entered by the user and also performing a biometric verification;

using a camera of the kiosk to capture video of a user of the kiosk during use of the kiosk;

transmitting the video to a server;

periodically extracting, at the server, a frame of the video;

performing a check after the user identity has been authenticated by the kiosk and during the transmission of the video, at the server, to determine if a face is present during the frame; and blurring the video transmission, at the server, to a destination if the check determines that the face is not present in the frame.

23. The method of claim 22, further comprising:

detecting the presence of a second face in the video frame and, while the presence of the second face is detected, blurring the video transmission, at the server, to the destination.

24. A system for providing services to a secure facility, the system comprising:

a plurality of kiosks located at a secure facility, each kiosk comprising a processor, display, speaker, and microphone; and a server that communicates with the kiosks and a device of an outside party via one or more network connections, the server comprising a server processor, a network interface unit, and a computer memory;

wherein the server is configured to receive a communications request from the device of the outside party and, in response to the received communications request, identify a kiosk in a vicinity of a requested party and transmit a message to the kiosk, wherein the kiosk is configured to receive the message, and, upon receipt of the message, display an incoming communications request message and initiate a login procedure, wherein the server is configured to authenticate a user of the device, and wherein, after the user has been authenticated and during a transmission of a video, the video being transmitted from the kiosk to the calling party, the server is configured to periodically extract a frame of the video; and perform a check to determine if a face is present in the frame, and the server is further configured to blur the video being transmitted to the calling party when the check determines that the face is not present in the frame.

25. The system of claim 24, wherein the communications request is a request to initiate a voice call or a video call.

26. The system of claim 24, wherein the server identifies the kiosk in the vicinity of the requesting party by referencing a resident schedule that is stored on a computer readable medium of the server.

27. The system of claim 24, wherein the kiosk is configured to play an alert tone or audio message upon receiving the message.

28. The system of claim 24, wherein the server is configured to detect the presence of a second face in the video frame and, while the presence of the second face is detected, the server is configured to blur the video being transmitted to the calling party.

29. The system of claim 24, wherein the server is configured to receive a request for a resident from the device of outside party, identify one of the plurality of kiosks that is located in an area the resident is housed in using a schedule of the resident, and activate the identified one of the plurality of kiosks to play an alert tone and display the resident's name.

* * * * *